United States Patent
Gershon et al.

(10) Patent No.: US 9,607,404 B2
(45) Date of Patent: *Mar. 28, 2017

(54) SYSTEM FOR NORMALIZING, CODIFYING AND CATEGORIZING COLOR-BASED PRODUCT AND DATA BASED ON A UNIVERSAL DIGITAL COLOR SYSTEM

(71) Applicant: ZENCOLOR CORPORATION, Coconut Grove, FL (US)

(72) Inventors: Dann Gershon, Coral Gables, FL (US); David Robinson, Jersey City, NJ (US); Jonathan Wilder, Miami, FL (US); Maurice W. Schonfeld, New York, NY (US)

(73) Assignee: ZENCOLOR CORPORATION, Coconut Grove, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,858

(22) Filed: Sep. 6, 2016

(65) Prior Publication Data

US 2016/0371854 A1 Dec. 22, 2016

Related U.S. Application Data

(63) Continuation-in-part of application No. 14/808,108, filed on Jul. 24, 2015, now Pat. No. 9,436,704, which (Continued)

(51) Int. Cl.
G06K 9/00 (2006.01)
G06K 9/46 (2006.01)
(Continued)

(52) U.S. Cl.
CPC .......... G06T 7/408 (2013.01); G06F 17/3025 (2013.01); G06K 9/4652 (2013.01);
(Continued)

(58) Field of Classification Search
None
See application file for complete search history.

(56) References Cited

U.S. PATENT DOCUMENTS

| | | | |
|---|---|---|---|
| 3,652,092 A | 3/1972 | Boyer et al. | |
| 5,668,633 A | 9/1997 | Chetam et al. | |
| (Continued) | | | |

FOREIGN PATENT DOCUMENTS

| | | | |
|---|---|---|---|
| JP | 2000-348050 A | 12/2000 | |
| JP | 2002-180318 A | 6/2002 | |
| (Continued) | | | |

*Primary Examiner* — Bernard Krasnic
(74) *Attorney, Agent, or Firm* — Im IP Law; C. Andrew Im

(57) ABSTRACT

A system for normalizing, codifying and categorizing divergent color systems into a universal color system. A server connected to a communications network receives, processes, codifies and categorizes divergent color data from a merchant system. A middleware engine of the server receives a data feed comprising a plurality of color swatches or images from the merchant system, and normalizes the data feed into a common format. A server processor extracts image data comprising a plurality of product images from the normalized data feed, identifies and converts at least one dominant product color in each product image to a digital value, and assigns a hexadecimal code of the universal color system to each product image that is closest to the digital value of each product image based on color component intensity values of at least one dominant product color in each product image. A product categorization engine categorizes each product image into one of a plurality of product categories.

20 Claims, 23 Drawing Sheets

Related U.S. Application Data is a continuation-in-part of application No. 14/055,884, filed on Oct. 17, 2013, now Pat. No. 9,348,844, which is a continuation of application No. 13/910,557, filed on Jun. 5, 2013, now Pat. No. 8,600,153, which is a continuation-in-part of application No. 13/762,160, filed on Feb. 7, 2013, now abandoned, and a continuation-in-part of application No. 13/762,281, filed on Feb. 7, 2013, now abandoned, and a continuation-in-part of application No. 13/857,685, filed on Apr. 5, 2013, now abandoned, and a continuation-in-part of application No. PCT/US2013/025135, filed on Feb. 7, 2013, and a continuation-in-part of application No. PCT/US2013/025200, filed on Feb. 7, 2013, and a continuation-in-part of application No. PCT/US2013/035495, filed on Apr. 5, 2013, said application No. 13/857,685 is a continuation-in-part of application No. 13/762,160, filed on Feb. 7, 2013, now abandoned, and a continuation-in-part of application No. 13/762,281, filed on Feb. 7, 2013, now abandoned, said application No. PCT/US2013/035495 is a continuation-in-part of application No. 13/762,160, and a continuation-in-part of application No. 13/762,281.

(60) Provisional application No. 61/656,206, filed on Jun. 6, 2012, provisional application No. 61/679,973, filed on Aug. 6, 2012, provisional application No. 61/792,401, filed on Mar. 15, 2013, provisional application No. 61/595,887, filed on Feb. 7, 2012.

(51) Int. Cl.
*G06K 9/66* (2006.01)
*G06T 7/00* (2006.01)
*G06F 17/30* (2006.01)
*G06T 7/40* (2017.01)
*G06K 9/62* (2006.01)

(52) U.S. Cl.
CPC ........... *G06K 9/6202* (2013.01); *G06K 9/628* (2013.01); *G06T 7/0081* (2013.01); *G06T 2207/10024* (2013.01); *G06T 2207/20021* (2013.01)

(56) References Cited

U.S. PATENT DOCUMENTS

| | | | |
|---|---|---|---|
| 6,349,300 B1 | 2/2002 | Graf et al. | |
| 6,563,510 B1 | 5/2003 | Rice et al. | |
| 6,594,386 B1 | 7/2003 | Golshani et al. | |
| 6,924,817 B2 | 8/2005 | Rice et al. | |
| 7,187,386 B2 | 3/2007 | Rice et al. | |
| 7,561,735 B2 | 7/2009 | Levin et al. | |
| 7,689,544 B2 | 3/2010 | Koenig | |
| 7,711,610 B2 | 5/2010 | Iwaki et al. | |
| 8,532,372 B2 | 9/2013 | Youngman | |
| 8,600,153 B2 * | 12/2013 | Gershon | G06F 17/3025 382/162 |
| 9,047,633 B2 * | 6/2015 | Gershon | G06Q 30/0627 |
| 9,087,357 B2 * | 7/2015 | Gershon | G09G 5/022 |
| 9,348,844 B2 * | 5/2016 | Gershon | G06F 17/3025 |
| 9,436,704 B2 * | 9/2016 | Gershon | G06F 17/3025 |
| 2001/0049636 A1 | 12/2001 | Hudda et al. | |
| 2002/0069131 A1 | 6/2002 | Miyata et al. | |
| 2002/0184171 A1 | 12/2002 | McClanahan | |
| 2003/0174143 A1 | 9/2003 | Rice et al. | |
| 2003/0231185 A1 | 12/2003 | Kupersmit | |
| 2006/0001665 A1 | 1/2006 | Kupersmit | |
| 2006/0210952 A1 | 9/2006 | Toland | |
| 2006/0250623 A1 | 11/2006 | Newman et al. | |
| 2007/0028178 A1 | 2/2007 | Gibson et al. | |
| 2008/0046410 A1 | 2/2008 | Lieb | |
| 2008/0075360 A1 | 3/2008 | Li et al. | |
| 2008/0118146 A1 | 5/2008 | Cieplinski | |
| 2008/0316513 A1 | 12/2008 | Yamazoe | |
| 2009/0112862 A1 | 4/2009 | Mo | |
| 2009/0281925 A1 | 11/2009 | Winter et al. | |
| 2010/0020095 A1 | 1/2010 | Reynolds et al. | |
| 2010/0110101 A1 | 5/2010 | Relyea et al. | |
| 2010/0254600 A1 | 10/2010 | Kim | |
| 2012/0045121 A1 | 2/2012 | Youngman | |
| 2012/0203760 A1 | 8/2012 | Abraham et al. | |
| 2013/0044944 A1 | 2/2013 | Wang et al. | |
| 2013/0083999 A1 | 4/2013 | Bhardwaj et al. | |

FOREIGN PATENT DOCUMENTS

| | | |
|---|---|---|
| JP | 2003099629 A | 4/2003 |
| JP | 2004-118444 A | 4/2004 |
| JP | 2004312444 A | 11/2004 |
| JP | 2004318445 A | 11/2004 |
| KR | 10-2002-0004736 A | 1/2002 |
| KR | 10-2002-0074528 A | 10/2002 |
| KR | 10-2003-0029616 A | 4/2003 |
| KR | 10-2008-0032890 A | 4/2008 |
| KR | 20090094526 A | 9/2009 |

* cited by examiner

SYSTEM FOR NORMALIZING, CODIFYING AND CATEGORIZING COLOR-BASED PRODUCT AND DATA BASED ON A UNIVERSAL DIGITAL COLOR SYSTEM

RELATED APPLICATIONS

The present application is a continuation-in-part of application Ser. No. 14/808,108 filed Jul. 24, 2015, which is incorporated herein by reference in its entirety.

Application Ser. No. 14/808,108 is a continuation-in-part of application Ser. No. 14/055,884 filed Oct. 17, 2013, which is incorporated herein by reference in its entirety.

Application Ser. No. 14/055,884 is continuation of application Ser. No. 13/910,557 filed Jun. 5, 2013, now U.S. Pat. No. 8,600,153, which is incorporated herein by reference in its entirety.

Application Ser. No. 13/910,557 is a continuation-in-part of application Ser. No. 13/762,160 filed Feb. 7, 2013, a continuation-in-part of PCT/US13/25135 filed Feb. 7, 2013, a continuation-in-part of application Ser. No. 13/762,281 filed Feb. 7, 2013, a continuation-in-part of PCT/US13/25200 filed Feb. 7, 2013, a continuation-in-part application Ser. No. 13/857,685 filed Apr. 5, 2013, and a continuation-in-part of PCT Application No. PCT/US13/35495 filed Apr. 5, 2013, each of which is incorporated herein by reference in its entirety.

Application Ser. No. 13/857,685 is a continuation-in-part of application Ser. No. 13/762,160 filed Feb. 7, 2013 and a continuation-in-part of application Ser. No. 13/762,281 filed Feb. 7, 2013, each of which is incorporated herein by reference in its entirety.

Application Ser. Nos. 13/910,557, 13/857,685, PCT/US13/35495, each of which claims priority to Provisional Application No. 61/656,206 filed Jun. 6, 2012, Provisional Application No. 61/679,973 filed Aug. 6, 2012 and Provisional Application No. 61/792,401 filed Mar. 15, 2013, each of which is incorporated herein by reference in its entirety.

Application Ser. Nos. 13/762,281, 13/762,160, PCT/US13/25135 and PCT/US13/25200, each of which claims priority to Provisional Application No. 61/595,887 filed Feb. 7, 2012, Provisional Application No. 61/656,206 filed Jun. 6, 2012, and Provisional Application No. 61/679,973 filed Aug. 6, 2012, each of which is incorporated herein by reference in its entirety.

PCT/US13/35495 claims priority to application Ser. No. 13/762,160, application Ser. No. 13/762,281, each of which is incorporated herein by reference in its entirety.

FIELD OF THE INVENTION

The claimed invention relates to a digital color-based categorization for data analytics, more particularly, a system and method for categorizing color-based product and data based on a universal digital color system.

BACKGROUND OF THE INVENTION

At times, a user will want to search for a product by color even though it is an attribute that cannot be described adequately using words. For example, other than using rudimentary color names, such as "red" and "blue," searching for products of a particular shade using color as a parameter is extremely difficult, even when the color is relatively popular and intuitively should be easy to locate. For example, there are numerous colors which would fit the simple "red" or "blue" description, and searching using the textual word "red" is not likely to bring up the specific red or the specific product of interest. Also, searches based on a particular type of color by name, such as "rose red" or "ocean blue," are unlikely to turn up the color of interest, as there may be a number of different colors, each with a different name or with multiple names varying by the naming convention used. Similarly, searching for a pattern made of colors, such as "blue and red stripes" is unlikely to turn up the desired pattern of particular colors.

Many of the drawbacks involving color-based searching stem from the nature of internet searching, which has historically been text-based, thus requiring a user to enter text into a search engine to describe the information sought. With regard to color, textual color names are typically tagged or embedded beneath an image of a product or associated webpage as metadata, making it virtually impossible to obtain reliable and complete search results when specific color shades are sought. More specifically, because many search systems that implement searching based on a color (or a pattern) are operable only as text searching, a system may allow a user to select a color by name or even "click" on the color (in the form of a color swatch) and then search for the selected color. However, in these instances, the system typically converts the inputted search parameter to a text-string associated with or representing a particular color. For example, a search system may search based on clicking red swatch on a webpage but converts the click to a search for "red" as text, but not as an actual color. In such a system, the name of the color "red" is "tagged" to an image by way of a text string and the search is based on matching the input "red" to the text string "red" on the tag, and not to the color. From a consumer's perspective, such a system is insufficient to reliably capture all relevant products that are currently available in the particular shade of red that are being sought. From a Merchant perspective, such a system does not allow for dynamic analysis or codification of color that is a crucial but missing data set in understanding consumer preferences.

Even color systems that offer naming conventions suffer from underlying drawbacks in their inconsistent application by Merchant users and their vendors. For example, a wholesale buyer for a retailer may decide to order a line of products from a vendor in a color that is identified as "cobalt blue." A second wholesale buyer at the same retailer may order another line of products from a second vendor in a color that the second buyer also identifies "cobalt blue," having the intention that the colors be precisely the same so that a purchaser of product from the first line will be more inclined to purchase the second line of product as a matching set. Indeed, the variation in color between two products that purportedly have the 'same color' can be remarkable when the products are placed side by side. The lack of consistency among vendors and suppliers, even when the same color names are utilized, is often not appreciated until after the products arrive, at which time it is too late to ameliorate the situation.

Direct searching based on a particular color or a swatch has not been effectively accomplished with text-based systems or search systems that lack a universal color system. For example, if a user is in possession of one article of clothing and wishes to purchase a matching item, existing tools leave the user with the burden of determining the color of the clothing and what a matching color might be. Thus, the user is left to matching based on what "appears" to match (subject to variations in color on a screen).

Current systems further lack the ability to aggregate a user's preferred and/or customized colors onto a unified area or palette for purposes of identifying and searching for products. Individuals typically have preferred colors. and it would be beneficial to have that group of preferred colors collected and readily available to that user in a single palette. Also, use of the palette for forming color combinations and to perform searches based on a primary color and a secondary color (and a pattern) are lacking in the prior art. To that end, it would be beneficial to have that group of preferred colors identified, collected and readily available to that user in a single palette for effective color-based searching. Since these searches are presently unavailable, the data associated with these searches is also unavailable to be used for any data analytics, real-time or otherwise. Such data analytics would be useful to merchants and/or manufacturers for both marketing and operations purposes. These analytics could relate to user preferences for colors and patterns by analyzing user browsing and purchasing behavior, and with associated user data, such as demographic data. Such information can be made available across a variety of user variables (e.g., gender, age, geography, etc.).

In addition to the deficiencies and drawbacks of current systems for consumers, there are many related deficiencies for merchants, retailers, wholesalers and/or manufacturers as well. To start, the captured data can be used for targeted or micro-targeted advertising based on, for example, user preferences, preferences of affinity group members, or user purchase/browsing history.

While current inventory management systems (IMS) include inventory reporting and analysis, and current supply chain management (SCM) systems include production reporting, the merchants, retailers, wholesalers and/or manufacturers currently lack real-time consumer related data to properly forecast and respond to color-trending data. Because of its ability to identify histories of user browsing and purchases in combination with user demographics, the claim invention allows Merchants to forecast color trends in real time and determine, by product and demographics, which colors will be most successful, and plan supply chain and inventory management accordingly. Retailers and manufacturers currently rely on focus groups, which can include as many as 30,000 people in the relevant demographics and geo-locations to sample and obtain user color information. Such an effort is both time-consuming and costly. Because gathering and analyzing of data from the group can take up to eighteen months, once a sampling is complete, the data may no longer be relevant. The SCM must be adjusted in real-time to create the appropriate adjustments during the manufacturing process. More and more retailers and wholesalers are working with "just in time" inventory, shifting the onus from the retailer to the vendor or the factory. Adjustments in the SCM are the only solution to the inventory problems. Thus, by capturing user preferences based off of a purchase history, browsing history, word association, and color selections, all captured in real time, a relevant collection of data may be obtained and used by Merchants to enhance the consumer experience and streamline operations.

OBJECT AND SUMMARY OF THE INVENTION

Therefore, it is an object of the claimed invention to provide a system for normalizing, codifying and categorizing color-based product and data based a universal color language/system.

Another object of the claim invention is to provide aforesaid system that performs efficient color-based and product-related searches in the Merchants' inventory management systems (IMS) and/or supply chain management (SCM) systems that have been categorized and reverse mapped into hexadecimal codes of the universal color language/system.

A still another object of the claimed invention is to provide categorized, codified and normalized database(s) of products that both Merchants and consumers can search for and match products using non-textual or color based queries.

A yet another object of the claimed invention is to provide aforesaid system and method that can search for products in aforesaid database(s) based on color and patterns in the product image data.

In accordance with an exemplary embodiment of the claimed invention, a system is provided for normalizing, codifying, and categorizing divergent color systems into a universal color language/system. A server connected to a communications network receives, processes, codifies and categorizes the divergent color data from a Merchant system. A middleware engine of the server receives a data feed comprising a plurality of color swatches or images from the Merchant system, and normalizes the data feed into a common format. An image segmentation processor of the server extracts the image data comprising a plurality of product images from the normalized data feed, and segments each product image into a plurality of segments. A dominant color processor of the server analyzes each segment to determine a dominant color for each segment, and determines at least one dominant product color for each product image based on prevalence of at least one dominant product color. A matched color processor of the server converts at least one dominant product color to a digital value based on color component intensity values, and assigns a hexadecimal code of the universal color language/system to each product image that is closest to the digital value of each product image. A product categorization engine of the server categorizes each product image into one of a plurality of product categories. A database stores the data feed, each product image, each segment of each product image, the dominant color for each segment, at least one dominant product color for each product image, the digital value and the hexadecimal code of each product image, and the product category of each product image.

In accordance with an exemplary embodiment of the claimed invention, the aforesaid product categorization engine further categorizes each product image in accordance with at least one product related data and further categorizes each product image in accordance with at least one depersonalized product related data.

In accordance with an exemplary embodiment of the claimed invention, the aforesaid matched color processor determines an Euclidian distance between the digital value and each hexadecimal code of the universal color language/system based on their color component intensity values. The matched color processor assigns the hexadecimal code yielding a shortest Euclidian distance to said each product image by the matched color processor.

In accordance with an exemplary embodiment of the claimed invention, the aforesaid middleware engine receives data feeds from a plurality of SCM systems over the communications network. The server generates a product database from data feed received from the SCM systems indexed and searchable by color-based queries.

In accordance with an exemplary embodiment of the claimed invention, the aforesaid middleware engine depersonalizes the data feeds received from the supply chain management systems to remove Merchant or supplier identifying information.

In accordance with an exemplary embodiment of the claimed invention, the aforesaid middleware engine receives data feeds from a plurality of inventory management systems over the communications network. The server generates a product database from data feed received from the inventory management systems indexed and searchable by color based queries.

In accordance with an exemplary embodiment of the claimed invention, the aforesaid middleware engine depersonalizes the data feeds received from the inventory management systems to remove Merchant or consumer identifying information by the middleware engine.

In accordance with an exemplary embodiment of the claimed invention, a color search engine of the server receives a color-based search query comprising user's color selection from a processor based client device associated with a user over the communications network. The user's color selection comprises at least one hexadecimal color code of the universal color language/system. The color search engine searches a database engine for products having the hexadecimal color codes within a predetermined range of the hexadecimal color code of the user's color selection to provide a search result. The user's color selection and the search result are stored in the database, and the color preference history of the user is updated in the database.

In accordance with an exemplary embodiment of the claimed invention, the aforesaid color search engine searches at least one of the following: a data warehouse maintained by a service provider, IMS of a plurality of Merchants and SCM systems of a plurality of Merchants.

In accordance with an exemplary embodiment of the claimed invention, the aforesaid color search engine ranks the products on the search result based on their hexadecimal color codes. A product having the hexadecimal color code closer to the hexadecimal color code of the user's color selection is ranked higher than a product having the hexadecimal color code further from the hexadecimal color code of the user's color selection.

In accordance with an exemplary embodiment of the claimed invention, the aforesaid server receives textual search criteria from the client device over the communications network. The textual search criteria can comprise at least one of the following: product description, product availability, size information, merchant information, product category, brand information, pattern information, complementary colors or complementary colored products. The text search criteria could be part of a specification or spec sheet or embedded in illustration as part of the image analysis performed by the image analytics processor or system. The color search engine filters the search results based on the textual search criteria.

In accordance with an exemplary embodiment of the claimed invention, the aforesaid product categorization engine categorizes the search result based on color and product category by the product categorization engine; and stores the categorized search result in the database.

In accordance with an exemplary embodiment of the claimed invention, the aforesaid product categorization engine further categorizes the search result in accordance with at least one product related data, and further categorizes the search result in accordance with at least one depersonalized product related data.

In accordance with an exemplary embodiment of the claimed invention, the aforesaid color search engine receives a color-based search query from the client device associated with the user over the communications network. The color-based search query comprises a digital image of an item and the hexadecimal color code associated with the item. The image segmentation processor segments the digital image of the item into a plurality of segments. The dominant color processor analyzes each segment to determine a dominant color for each segment, and determines at least one dominant product color for the digital image of the item based on prevalence of at least one dominant product color in each segment. The matched color processor converts at least one dominant product color to a digital value based on color component intensity values, and assigns a hexadecimal code of the universal color language/system to the digital image of the item that is closest to the digital value of each product image. An image processor of the server determines whether the hexadecimal code determined from the digital image of the item matches or is within a predetermined threshold of the hexadecimal code of the item received from the client device of the user.

The claimed invention may stand on its own or serve as an enhancement of or upgrade to existing IMS and/or SCM systems directed to facilitating a wide range of functions, including search, product selection, purchase, marketing, advertising, product planning and sales. The claimed invention can apply operations research principles to selected problems in retailing by organizing and identifying products according to color and/or pattern and by using those attributes as primary indicators, where retailing extends from product development and manufacturing through customer service, inception to sale.

In accordance with an exemplary embodiment of the claimed invention, aforesaid system can be utilized to dynamically analyze codified color-based preferences, trends and system-wide activities to make targeted and micro-targeted product recommendations to users with color as a primary product attribute.

Generally, the claimed invention provides a system and a set of interfaces that provide users and Merchants with a number of previously unavailable opportunities and tools in the context of color identification, selection and matching. The non-textual color searches utilizing the universal color codes provide users with relevant search results for a number of merchant products that correlate more closely (or exactly) to the colors for which a user is searching.

With respect to the hardware of the system, CPU-based servers are arranged to communicate with one another and with one or more data warehouses, preferably residing therein, which are used to store user data, merchant data, product data, and color data.

Various other objects, advantages and features of the present invention will become readily apparent from the ensuing detailed description, and the novel features will be particularly pointed out in the appended claims.

BRIEF DESCRIPTION OF THE DRAWINGS

The above-described and other advantages and features of the present disclosure will be appreciated and understood by those skilled in the art from the following detailed description and drawings of which.

DETAILED DESCRIPTION OF THE EMBODIMENTS

Figure 1:
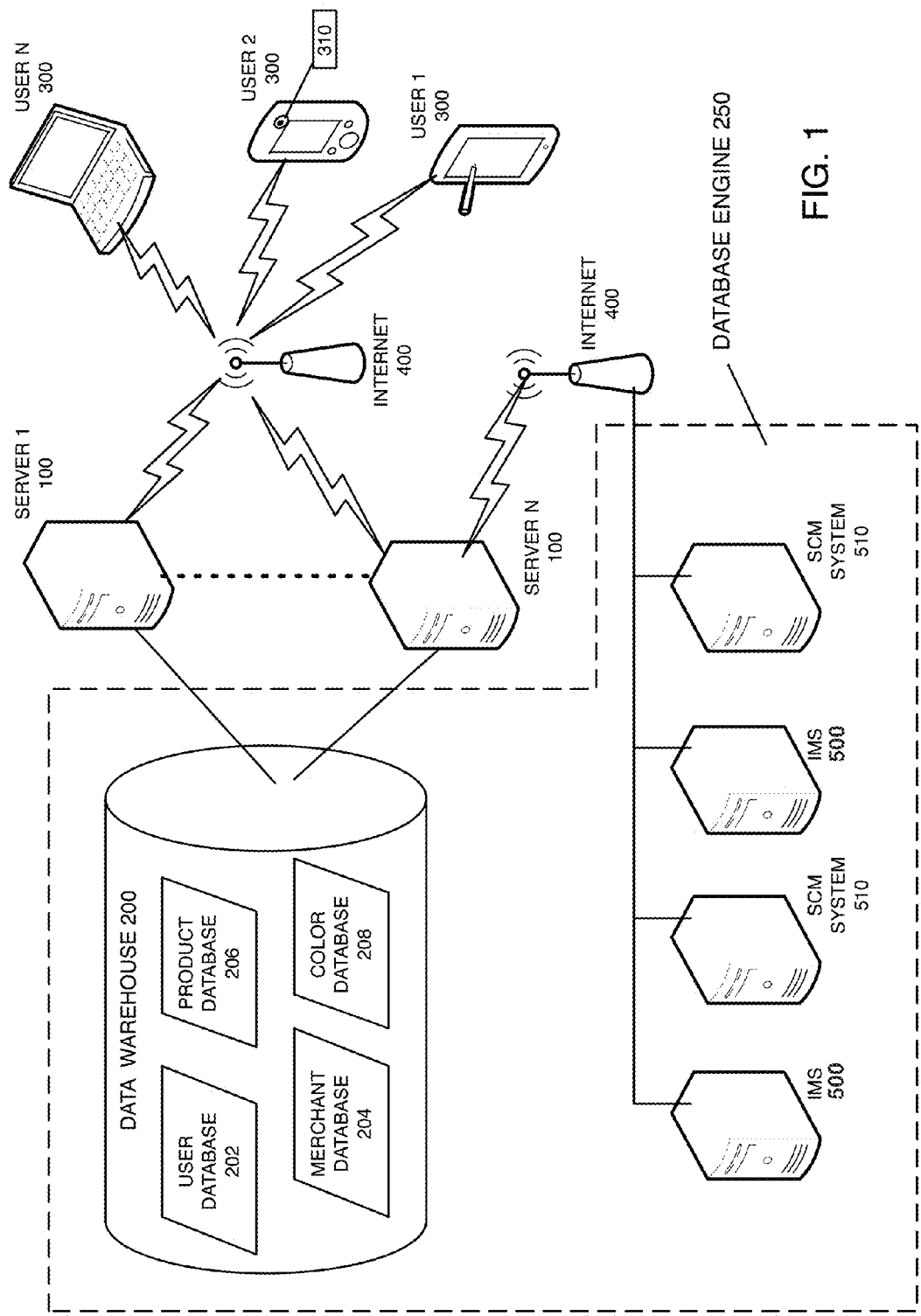
FIG. 1 is a block diagram of the system in accordance with an exemplary embodiment of the claimed invention.

In accordance with an exemplary embodiment of the claimed invention, non-textual color-based systems and interfaces are provided to categorize, normalize and dynamically analyze color-based product and data based on a unified or universal color system as described in applicant's U.S. application Ser. No. 13/910,557 (now U.S. Pat. No. 8,600,153), pending U.S. application Ser. No. 14/055,884 and pending international Application No. PCT/US13/44317 (hereinafter collectively referred to herein as "applicant's normalization/codification application"), each of which is incorporated herein by reference in its entirety. To categorize and analyze massive amounts of data across a diverse range of product categories requires a common denominator or attribute that all products have in common. Color is that common denominator provided that all colors have been reverse mapped from divergent color systems, normalized and converted into a universal color (or digital color) system, as exemplary described in applicant's normalization/codification application. Accordingly, the claimed invention proceeds upon desirability providing a digital color-based categorization for data analytics.

In accordance with an exemplary embodiment of the claimed invention, the claimed color-based system collects, analyzes and manages color data, non-color data, such as textual product data, and anonymous and non-anonymous user and merchant data, to provide a more robust product searching and purchase experience for users and a more effective means for Merchants to target, advertise and sell to consumers.

In accordance with an exemplary embodiment of the claimed invention, the system obtains data from a plurality of sources, developing business intelligence, real time data analytics, and predictive analytics from the obtained data, and providing services to consumers as well as a plurality of business types of users with respect to the developed business intelligence and "Big Data". In general, the data relate to (1) particular characteristics of purchasable products where at least one of the characteristics includes or relates to color, (2) consumers' preferences, and their actual and potential purchases, and (3) inventory and potential inventory of stores, including colors and sizes. Further, the claimed invention is extendable to include future inventory information derived from Supply Chain Management (SCM systems 510), including but not limited to previews of new products that are in development or in production.

In accordance with an exemplary embodiment of the claimed invention, another embodiment, the system of the claimed invention is directed to in-store inventory control and to assuring that likely purchases are available and visible in-store. In addition, the present invention leverages connectivity between a recipient's inventory control system and its manufacturers, distributors, and designers so as to expedite requested or anticipated inventory changes.

In another embodiment, the system of the claimed invention is directed to identifying likely and/or potential purchasers of particular products (including groups of products or products of a particular color) and offering Merchants an opportunity for targeted (or micro-targeted) advertising toward those likely and/or potential purchasers.

Turning to FIG. 1, in accordance with an exemplary embodiment of the claimed invention, there is shown an exemplary system configuration comprising a processor-based system 100, such as one or more computers or servers 100, with the hard disk or memory drives running software comprising machine-readable program instructions. The server 100 serves as and/or provides access to the data warehouse 200, which comprises the product database 206 and the color database 208. Preferably, the data warehouse 200 also comprises the user database 202 and the merchant database 204. All data are maintained in the data warehouse 200 or other conventional database system having read and write accessibility using a database management system. Although described herein for illustrative purposes as being separate data stores, in at least some alternative embodiments, the data stores may be combined in various combinations.

Information contained in the data warehouse 200 is accessible by both consumer and Merchant users via the client devices 300 over a communications network 400, such as the Internet 400. The client devices 300 comprise processor-based machine(s), such as laptops, PCs, tablets, smart phones and/or other web-enabled handheld devices to and from which the server 100 communicates. In accordance with an exemplary embodiment of the claimed invention, as exemplary shown in FIG. 4, the client device 300 comprises a processor 320, an optional camera 310, a memory 330, a display 340, a network connection facility 350 and an input device 360. The client devices 300 are connected to the server 100 utilizing customizable interfaces described herein. The custom interfaces may be in the form of a graphical user interface, an application to form a client-server arrangement and/or other well-known interface conventions known in the art. Depending on the nature of the user and its access to various forms of information, different interfaces are made available. To support various options, the system of the present invention preferably includes at least one application-programming interface (API) so that certain types of users could enhance their interfaces, and different ones may be available for users and Merchants.

In accordance with an exemplary embodiment of the claimed invention, the subscribers (consumer or Merchant users, etc.) gain entry to the server 100 by subscription using known security methodologies, e.g., username and password combination. Once a subscriber is authenticated, the server 100 provides access to the data that the subscriber can rightfully access.

Figure 6:
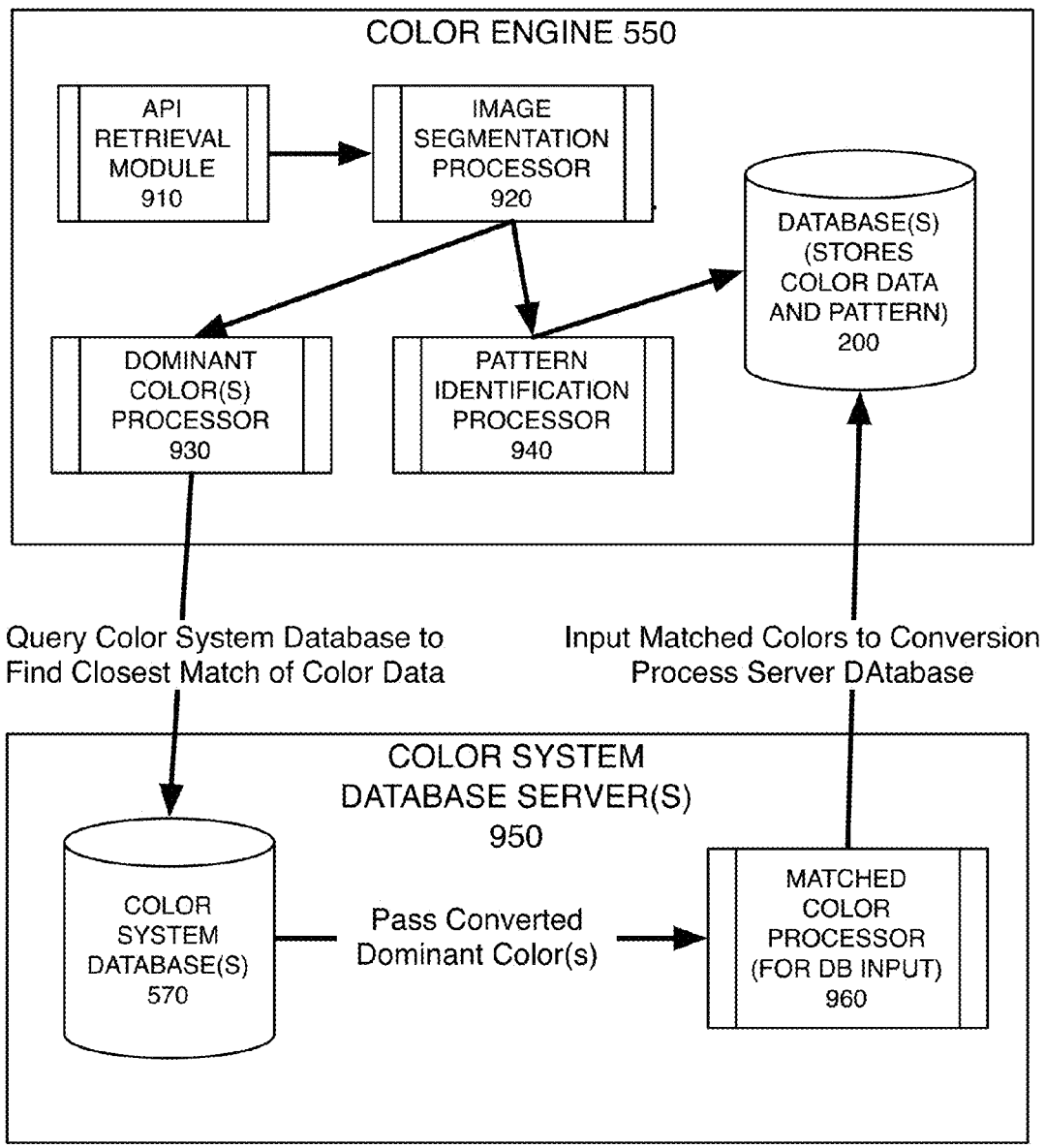
FIG. 6 is block diagram of the color engine in accordance with an exemplary embodiment of the claimed invention.

In accordance with an exemplary embodiment of the claimed invention, the server 100 stores/maintains hexadecimal and RGB color code or identification information and pattern identification information in the color database 208. Each individual color identification entry corresponds to one of a plurality of uniform/universal colors stored in the color database 208 and each individual pattern identification entry corresponds to one of a plurality of selectable patterns stored in the color database 208. The image processor 180 of the server 100 dynamically analyzes the color and pattern identification information to determine and associate dominant colors and patterns with a particular product. It is appreciated that for certain resource intensive applications, such as processing a large volume of feeds 505, 515 from multiple Merchants, as shown in FIG. 6, the claimed system can comprise one or more separate color engine(s) 550 for performing the dynamic image/swatch analysis 560 instead of the image processor 180. Due to its common functionalities, the color engine 550 and the image processor 180 is used interchangeably herein.

As more fully described in applicant's normalization/codification application, the server 100 receives product information (i.e., feeds) over the communications network 400 from a plurality of Merchants. The server 100 receives the feeds from retailers', wholesalers', and/or manufacturers' inventory management systems ("IMS") 500 or supply chain management ("SCM") systems 510. It is appreciated that for simplicity merchants, retailers, wholesalers and manufacturers will be collectively and interchangeably referred to herein as Merchants. Preferably, as new products are added or product information is updated in the IMS 500 and/or the SCM system 510, the corresponding information is transmitted to the server 100. That is, the IMS 500 and/or SCM system 510 dynamically transmit the updated information to the server 100.

SCM is the management of the flow of goods. It includes the movement and storage of raw materials, work-in-process inventory from inception to finished goods. SCM is defined as the design, planning, execution, control, and monitoring of supply chain activities with the objective of taking a product from inception (design) to a finished product. A product runs through the SCM system 510 and, when finished, transfers into the IMS 500 which tracks the finished goods.

The SCM system 510 is a production based system used by factories and their component suppliers. Within the SCM system 510 there may be an element of the IMS 500, which would be used to keep track of the inventory of components and raw materials. That said, the SCM system 510 is strictly a B2B (business-to-business) system that does not involve the consumer unless it is utilized for the use of "previewing" future inventory to a consumer in order to gauge future sales and make adjustments during the manufacturing process.

Whereas, the IMS 500 is a computer-based system for tracking inventory levels, orders, sales and deliveries. It can also be used in the manufacturing industry to create a work order, bill of materials and other production-related documents. Companies use the IMS 500 to avoid product overstock and outages. It is a tool for organizing inventory data that before was generally stored in hard-copy form or in spreadsheets.

Modern IMS 500 often rely upon barcodes and radio-frequency identification (RFID) tags to provide automatic identification of inventory objects. Inventory objects can include any kind of physical asset: merchandise, consumables, fixed assets, circulating tools, library books, or capital equipment. To record an inventory transaction, the IMS 500 uses a barcode scanner or RFID reader to automatically identify the inventory object, and then collects additional information from the operators via fixed terminals (workstations), or mobile computers.

The new trend in inventory management is to label inventory and assets with quick response (QR) Code, and use smartphones to keep track of inventory count and movement. These new IMS 500 are especially useful for field service operations, where an employee needs to record inventory transaction or look up inventory stock in the field, away from the computers and hand-held scanners.

The barcodes, RFID tags and QR codes are normally implemented during the production process as part of the Specification Sheet (Spec Sheet) which conveys all of the product details such as Color Code, Style Code, Vendor Code, and the information (fabric content, size, product category) that may be contained within any or all of these codes. The SCM system 510 stores the Spec Sheet. The barcodes, RFID tags and QR codes are also used as a tool to track inventory sales in the IMS 500 which is done by scanning at point of sale.

Without the universal digital color language/system of the claimed invention, color data from these various barcodes and tags cannot be identified or defined. If the color name is "sterling blue" and the actual color is a shade of blue grey, a search for the color will produce the tagged names unless the system is performing an image analysis for the precise color and ignoring the information provided by barcodes and tags. Once the color is normalized, codified and categorized into a single universal digital system of the claimed invention, the same search now can be performed more effectively by search based on color in the normalized, codified and categorized IMS 500 no matter what contextual color name is used to describe the product.

The claimed invention converts conventional SCM systems 510 and IMS 500 into an efficient color-based system that can be efficiently searched based on color and product categories. The claimed system normalizes, codifies and categorizes the data stored in the various SCM systems and IMS into colors based on the universal color code, and further categorizes the color normalized, codified and categorized data into product categories. Color is the only common denominator that all products have in common, the claimed invention provides a mechanism for searching based on the universal digital color code that is shared by the members of the supply chain management, including but not limited to merchants, manufacturers, distributors, retailers, component manufacturers, etc.

Since information relating to products provided by different Merchants is often expected to be formatted differently from one another, data received from various Merchants are transformed or normalized to a common format (e.g., an image of predetermined size, such as 500 pixels by 500 pixels), so that the information can be processed consistently and efficiently by the server 100. In accordance with an exemplary embodiment of the claimed invention, a middleware engine 520 of the server 100 receives IMS data feeds 505 and/or SCM data feeds 615 comprising textual and non-textual (color) product information respectively from the IMS 500 and/or SCM system 510, and categorizes and normalizes or transforms the data. The middleware engine 520 integrates and manages incoming data as the data is transmitted from the IMS 500 and/or the SCM systems 510 to server 100. That is, the middleware engine 520 manages the interaction between the otherwise incompatible applications residing on the server 100 and Merchant IMS 500 and/or Merchant SCM systems 510. Preferably, the middleware engine 520 categorizes and normalizes or transforms the IMS data feeds 505 and/or the SCM data feeds 515 into single item data format so that the data can be efficiently organized in an item table 540.

In accordance with an exemplary embodiment of the claimed invention, the middleware engine 520 performs digital image analysis (DMI) by ingesting or consuming programmatically flat digitally encoded images or extracted flat images from encoded digital video such as via a web-based graphical user interface (GUI), application program interface (API), or other known programmatic methods. The middleware engine 520 stores the ingested data from the external feeds 505, 515, such as the IMS feed 505 and/or SCM feed 515, in the data warehouse 200. As part of the ingestion process, the middleware 520 normalizes, categorizes and stores the data such that the item table 540 contains available product information from the proprietary Merchant IMS 500 and/or the proprietary Merchant SCM system 510, including textual and non-textual (color) product information.

By utilizing the universal color language or system for a plurality of Merchants, the claimed invention resolves a significant hindrance to user searching for and finding products from different Merchants. Reverse mapping enables dynamic analysis and codification of precise color. When layered into proprietary Merchant IMS 500 and/or SCM systems 510, the search performed in accordance with an exemplary embodiment of the claimed invention is further enhanced as it is no longer requires scraping the Internet. Likewise, the claimed invention ameliorates issues associated with Merchant product planning and production by providing them with standardized color information on sales, searches and availability.

In accordance with an exemplary embodiment of the claimed invention, the system and interfaces described herein are designed to operate in a 4096 universal color language/system or environment, but on a scale which allows the system to expand to over 16 million universal colors using the full range of 256 color intensities (measured from 0 to 255) for each of R (Red), G (Green) and B (Blue) which yields $256^3$ or 16,777,216 possible color variations, and hence potential 16 million universal color codes or classifications. The claimed invention utilizes the divergent color systems of multiple Merchants that have been reverse mapped, normalized and codified into a universal system for dynamic analysis, as described in applicant's normalization/codification application. Preferably, the 4096 selectable universal colors are equidistantly spaced along the full scale of available colors. However, it should be understood that the selectable colors may be moved along the scale or added or subtracted in order to provide more or less variation in a particular color region, depending on user and Merchant trends or needs.

Figure 2:
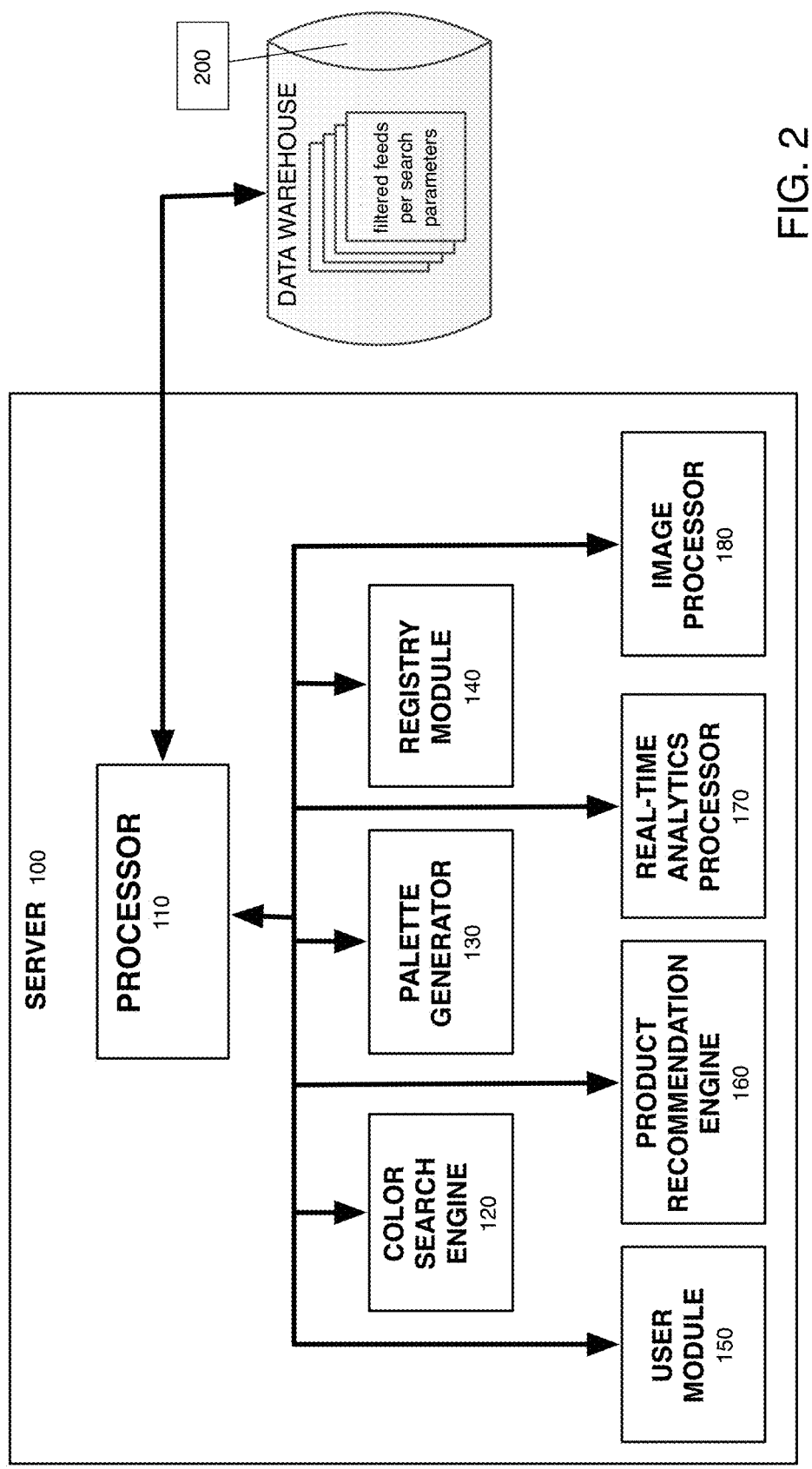
FIG. 2 is a block diagram of the server in accordance with an exemplary embodiment of the claimed invention.
Figure 3A:
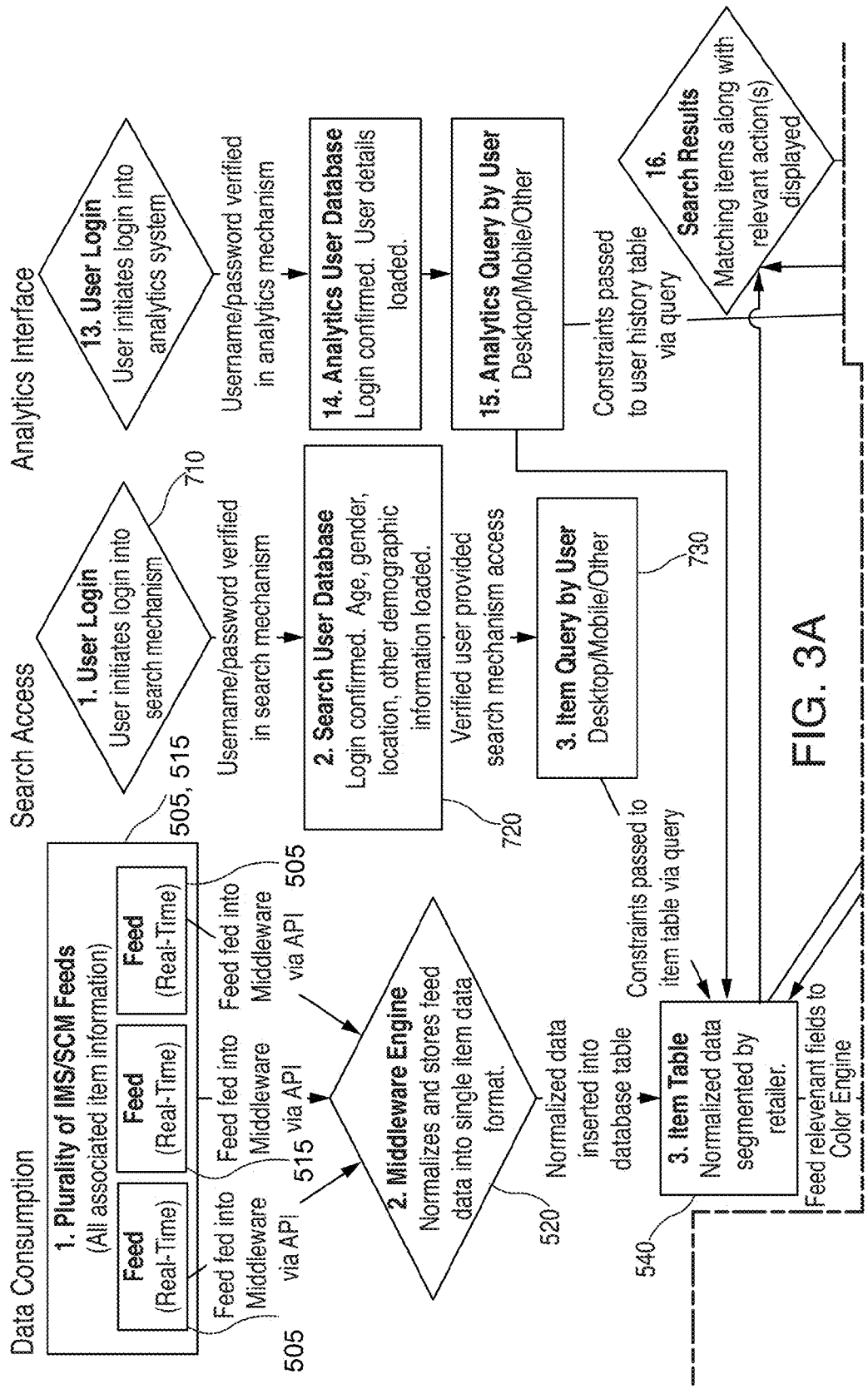
FIGS. 3A and 3B together comprise an exemplary system diagram depicting interaction among various system components to normalize, analyze and codify divergent Merchants' color systems into a single universal color language/system in accordance with an exemplary embodiment of the claimed invention.
Figure 3B:
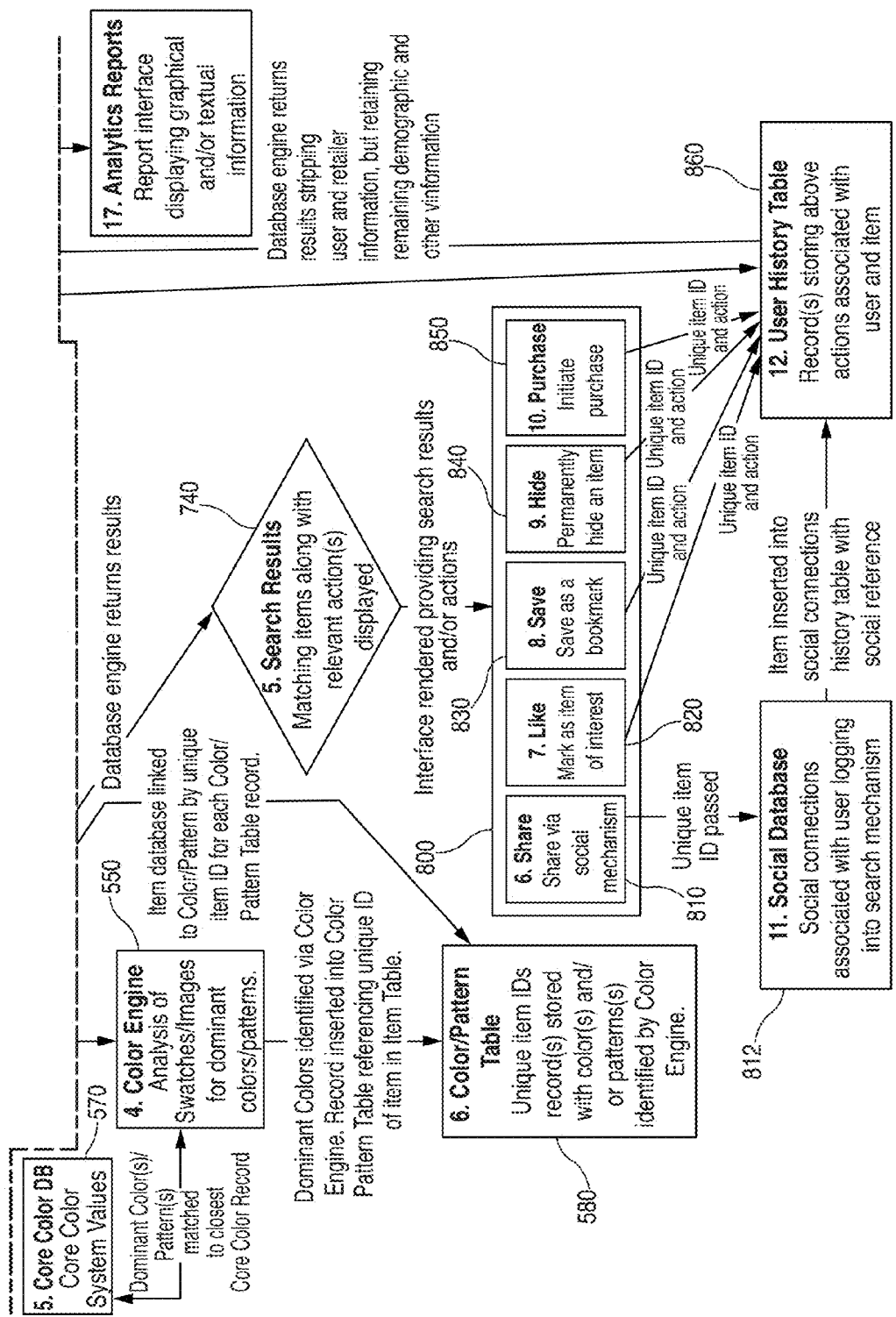

In accordance with an exemplary embodiment of the claimed invention, as shown in FIG. 2, the server 100 comprises one or more processors 110, a color search engine 120, a palette generator 130, a registry module 140, a user module 150, a product recommendation engine 160, a real-time analytics processor 170, an image processor 180 and a product categorization engine 190. The server 100 obtains data from a variety of sources. In accordance with an exemplary embodiment of the claimed invention, the color palette generator 130 of the server 100 generates color palette based on the user's personal and demographic information, such as, but not limited to, name, location, birth date, preferred products, and preferred colors, obtained from a user/subscriber (or a different user/subscriber) by the user module 150 of the server 100. The processor 110 of the server 100 obtains data regarding products and inventories from Merchants' IMS 500 as part of the IMS feeds 505 and/or from Merchants' SCM systems 510 as part of the SCM feeds 515, and the data may be in the form of text, images, videos, or some combination thereof.

Each data set introduced in the data warehouse 200 represents interrelated data sets that communicate with and rely on other data sets for complete information (but do not necessarily represent discrete data sets). These data sets may be accessed using a variety of database management systems (DBMS), including but not limited to relational database management systems (RDBMS) and "post-relational" database management systems (e.g., not only Structured Query Language ("NOSQL") database management systems. Furthermore, by using a DBMS such as RDBMS or a "post-relational" DBMS, the data may be available to a Merchant in a variety of manners, such as based on a specific demographic profile or a specific color or color grouping.

In general, data are received from a variety of sources, with at least some or all data/content received using live feeds from sources. Results may be sent to a variety of destinations, all related to combinations of consumer preferences, Merchant inventory, recent activity, and transactions. The sources of data include stores, including their inventory on-hand in various stores and on order, other Merchants and their facilities, and portions of a store or Merchant's supply chain, such as manufacturers and designers of the goods sold by the stores/Merchants, and preferably, including live feeds from each. Data sources also include consumers and financial institutions, as well as other independent sources (such as but not limited to news, weather, and media feeds). At least some of the data are received or obtained in real time by the data warehouse 200, preferably using live feeds. The real-time analytics processor 170 can perform analysis on demand or even as the data are being received by the server 100 and the data warehouse 200. The real-time analytics processor 170 delivers the results of the analysis in near real-time, even while the consumer is in the midst of shopping, such as delivering guidance to consumers as they shop based on recent inventory changes.

In accordance with an exemplary embodiment of the claimed invention, the user database 202 maintains and stores data specific to an individual user/subscriber, including but not limited to, personal information, demographic information, preferences, product history information, and social information. Personal information can include username, name, address (and more generalized geographic information), telephone data, birth date, astrological information, keywords with which the user associates, colors with which the user associates specific keywords, etc. Demographic information can include age, gender, education history, income, marital status, occupation, religion and the like. Preferences can include user's preference of colors, keywords with which the user associates a particular color, books, games, hobbies, sports, sports teams and the like. Some of the preferences can be obtained directly from the user and other preferences can be determined by the user module 150 of the server 100 based on user's web searches and/or purchases. Product history information can include user's browsing history, user's product ratings (e.g., likes and hides), user's purchase history, user's favorite stores, user's favorite brands, etc. Social information can include user-to-user or user-to-Merchant associations including, but not limited to, friends, family, colleague, romance, and acquaintance associations.

Personal information and demographic information are typically acquired from a user in the context of an initial user registration process and subsequently stored in the user database 202 which contain a broad range of records pertaining to user identification and user selections. The remaining forms of user data are acquired and recorded in the user database 202 as a result of user-system interactions via a graphical user interface.

In accordance with an exemplary embodiment of the claimed invention, the merchant database 204 maintains and stores data specifics to a Merchant, including but not limited to Merchant information, e.g., business name, contact name, address, and telephone number; demographic information, e.g., target demographics, user and Merchant demographics and preferences; physical locations; inventory information; supply chain information; plan-o-gram and store schematic information; and purchase history information.

In accordance with an exemplary embodiment of the claimed invention, product database 206 maintains and stores data specifics for products, including but not limited to: basic product identification information, including name of product; color identification information, including universal hexadecimal color code, color histogram and statistical information; pattern identification information, where applicable; image data, preferably in the form of a three-dimensional digital rendition of the product or another form of digital image of the product; recommendation data, including historical recommendations of products, ratings of products and advertisement data pertaining to products; and current and future product availability information. Preferably, the product data is indexed and categorized by product category, e.g., tables, chairs, shoes, shirts, socks, cars, paints, etc.

It should be appreciated that the product data stored in the product database 206 can be indexed, e.g., by product category, and cross-referenced in a number of useful ways by associating the product data with specific types of user data, Merchant data and color data. Thus, various types of product data can be referenced and manipulated utilizing, for example, any combination of color, availability, user preference and demographic. In that way, data in the data warehouse 200 is interrelated forming a powerful tool in the context of predictive analytics.

In accordance with an exemplary embodiment of the claimed invention, color database 208 maintains and stores data specifics for color information, including but not limited to: the hexadecimal color code or identification information; the RGB color identification information; the pattern identification information; the statistical color information; the keyword information; and the color grouping information. The hexadecimal color code or identification information is stored in the color database 208 as color data in the form of hexadecimal codes for each selectable color. The RGB color identification information is stored in the color database 208 as color data in the form of RGB component intensities for each selectable color. Preferably, each RGB component intensity maps to a corresponding hexadecimal code. The pattern identification information is stored in the color database 208 as color data in the form of pre-determined pattern configurations.

The statistical color information stored in the color database 208 as color data provides information relating to popularity or frequency of the product's color, e.g., frequency of men shirts containing a particular color. It can also provide trending information in real-time as to which product colors were popular in the current season and which product colors are forecasted to be popular in the next season based consumer purchases. This can be valuable to manufacturers and retailers in determining what product colors to manufacture and stock in their stores.

The keyword information stored in the color database 208 as color data can be frequently user-associated keywords relating to a particular color. The associated keywords may be based on an original color-word association index; user-defined keywords whereby a user associates colors with specific keywords; and pre-determined keywords which the user links with colors that the user determines are associated with those pre-determined keywords. The server 100 stores and updates keywords and their color associations as users continue to update and create associations in the color database 208. Color grouping information stored in the color database 208 as color data can be colors associated with a timeless collection or a particular trending collection (e.g., Spring 2012 colors).

It should be appreciated that data stored in the color database 208 as color data can be indexed, e.g., by product category, and cross-referenced in a number of useful ways by associating color data with specific types of user data, Merchant data and product data. In this way, data in the data warehouse 200 is interrelated forming a powerful tool in the context of predictive analytics.

By integrating a universal color identification technique into proprietary IMS 500 and/or SCM systems 510, available color data can be dynamically analyzed and integrated to enable Merchants to make color-based decisions and recommendations on a real-time basis that were heretofore not practical or, at best, based on incomplete information. With respect to supply chain management, inventories of products by particular colors can be managed and prioritized and decisions to replenish inventories can be effected sooner by triggering manufacturing and distribution as soon as, for example, certain sales thresholds are met, inventories dip below a particular level and/or additional consumer need is identified beyond current supply plans and capabilities. Moreover, Merchants can also advertise and give information users on expected availability using available supply chain management information. Similarly, such information can be used to allow users to pre-order products. On the inventory side, inventories of available products can be kept more stable by promoting products based on current and near-term availability. Furthermore, where a particular color for a product is unavailable, default settings enable recommendations to be made of the closest matching color. Thus, product search and recommendations can be made considering both current and future inventories.

In accordance with an exemplary embodiment of the claimed invention, as shown in FIG. 6, the color engine 550 comprises an API retrieval module 910, an image segmentation processor 920, a dominant color processor 930 and a pattern identification processor 940. It is appreciated that for certain resource intensive applications, such as processing a large volume of IMS feeds 505 and/or SCM feeds 515 from multiple Merchants, the claimed invention can comprises a multiple image processors 180 or one or more separate image server(s). The color engine 550 initiates the dynamical image analysis and color conversion process 560 by instructing the API retrieval module 910 to retrieve the normalized and categorized image data from the data warehouse 200. The color engine 550 converts colors based on component intensities to a digital value, preferably an universal 24-bit, 6-digit hexadecimal code which uses a base sixteen number instead of conventional base ten numbers, two digits for each of the Red, Green and Blue values. Similarly, the color engine 550 can express colors as a concatenation of digital values for R, G and B components of a color and assigned the concatenated digital values to a product as a color identifier. For example, if a particular color exhibits RGB values: 189 Red: 202 Green: 220 Blue, that number can be converted to a hexadecimal value BDCADC. 189 corresponds to BD in hex notation, 202 corresponds to CA in hex notation and 220 corresponds to CD in hex notation.

In accordance with an exemplary embodiment of the claimed invention, the middleware engine 520 normalizes product data from plurality of Merchants and the image processor 180 converts the Merchants' color data into universal color codes, preferably, a universal hexadecimal color code. The product categorization engine 190 then categorizes the normalized and color categorized product data into various product categories. It is appreciated that universal color code can be expressed as RGB component measurements or other digital representation. That is, the color engine 550 dynamically analyzes and converts the color swatch to a universal 24-bit hexadecimal color code, thereby codifying the non-uniform colors used by various Merchants into a universal hexadecimal color code.

In an accordance with an exemplary embodiment of the claimed invention, during the normalization process 530, the middleware engine 520 also strips away Merchant identification information (Merchant IDs) that could be used to relate product information to a specific Merchant. Also, the middleware engine 520 stores the personalized information, e.g., Merchant IDs, etc., in the personalized database 209. Also, the middleware engine 520 stores depersonalized information in the depersonalized database 210 by removing Merchant IDs from the data, thereby de-linking Merchant information from the products. This eliminates the possibility of competitors having access to sensitive or proprietary information.

As a result of previously adopted color naming conventions by a Merchant or as a result of Merchant-vendor practices which are ostensibly incompatible with assigning a universal color code to a given product, the color data of the IMS feed 505 and/or the SCM feed 515 need to be converted or reverse mapped to the hexadecimal color code of the universal color language/system. The image processor 180 performs the dynamic image/swatch analysis 560 to analyze, convert and reverse map the Merchant's product color to the claimed universal hexadecimal color code. In accordance with an exemplary embodiment of the claimed invention, the image processor 180 receives, dynamically analyzes and converts the Merchant's color swatch, preferably digital color swatch, alone or in combination with a Merchant color name (or names) for that color swatch to an universal color code.

The middleware engine 520 transforms and normalizes the IMS feed 505 and/or the SCM feed 515 comprising Merchant's color swatch and preferably, Merchant's textual product data. In accordance with an exemplary embodiment of the claimed invention, the image processor 180 or the color engine 550 performs dynamic image/swatch analysis 560 on the normalized data received from the middleware engine 520 to determine its dominant color(s) and/or pattern(s). As shown in FIGS. 3A, 3B, 5-7, the image processor 180 or the color engine 550 gathers and dynamically processes the image or color swatch present in the proprietary Merchant data feeds 505, 515 to determine and map the color swatch to an universal color code. The image processor 180 or the color engine 550 dynamically analyzes the color swatch to determine and store the dominant color(s) and pattern(s) as color data 208 in data warehouse 200.

Figure 5:
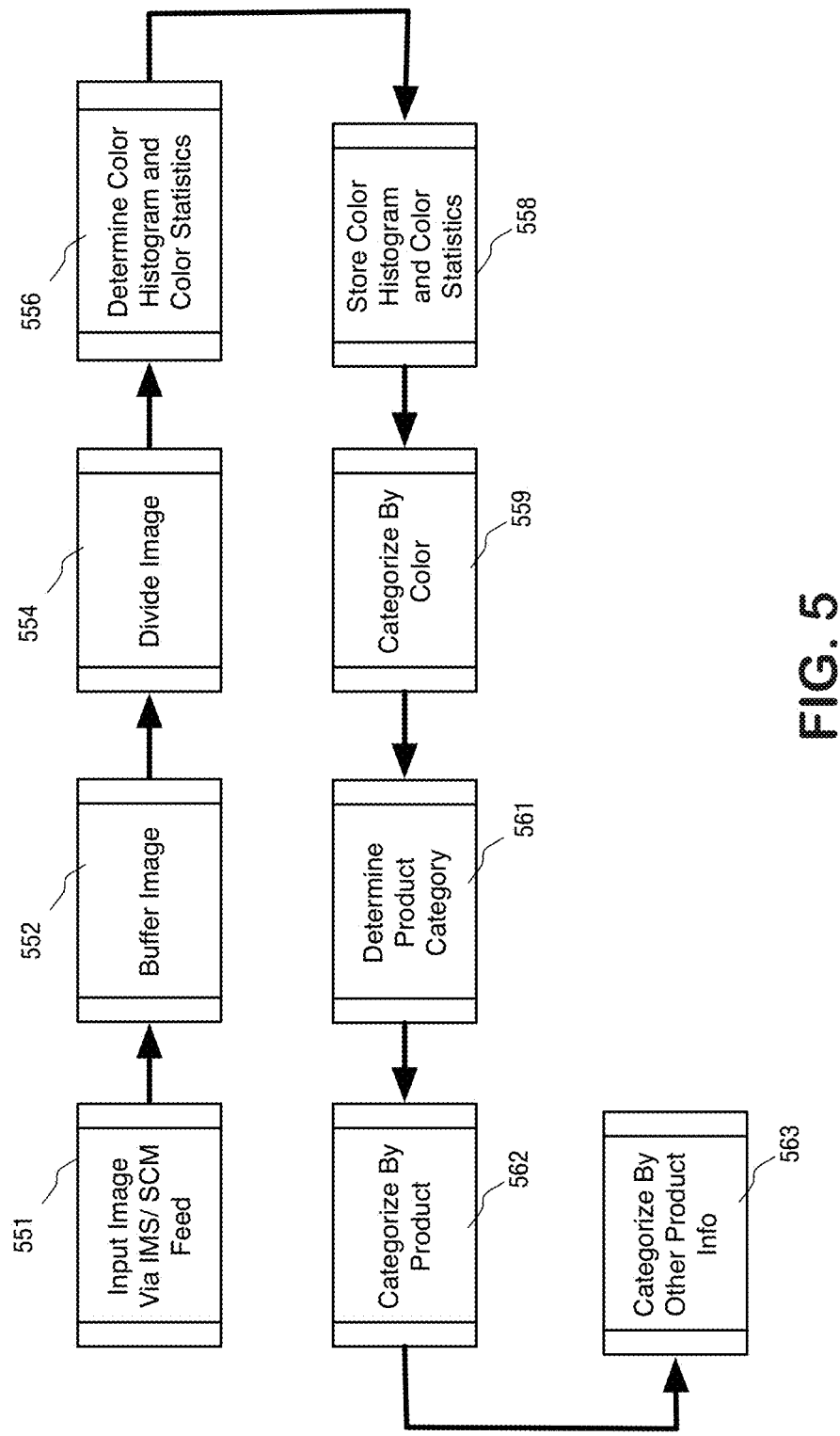
FIG. 5 is an exemplary flow chart depicting the dynamic color analysis of codifying, categorizing and reverse mapping a Merchant's color system to the claimed single universal color language/system by the color engine in accordance with an exemplary embodiment of the claimed invention.
Figure 8:
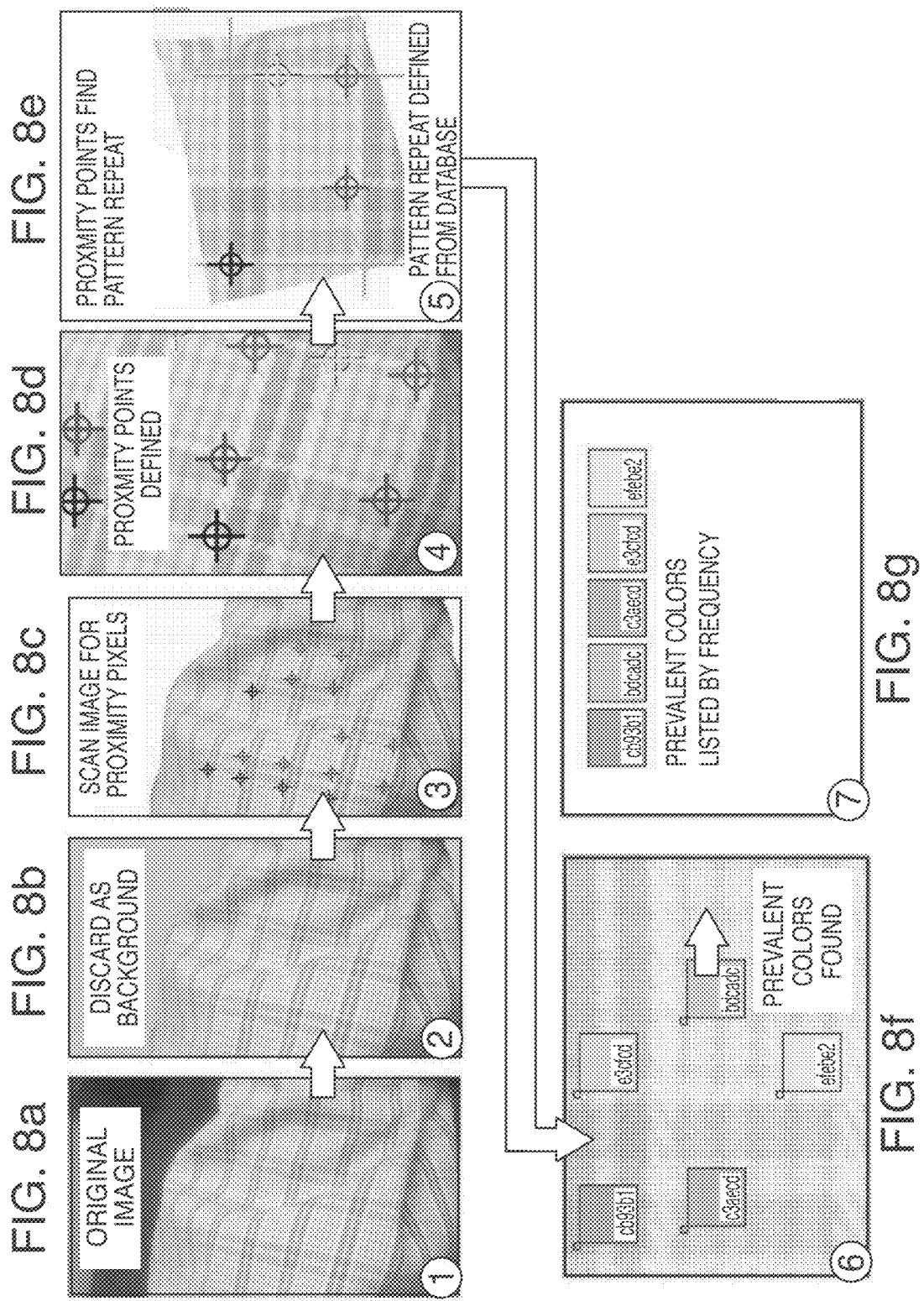
FIGS. 8a through 8g illustrate an exemplary process for identifying and recognizing color(s) and/or pattern(s) from a image of a striped shirt pattern by the image analytics processor in accordance with an exemplary embodiment of the claimed invention.

In accordance with an exemplary embodiment of the claimed invention, as shown in FIGS. 5 and 8, the image processor 180 or the color engine 550 dynamically analyzes images or swatches of the products received as part of the IMS data feeds 505 and/or SCM data feeds 515 respectively from the Merchant's IMS 500 and/or Merchant's SCM system 510 to determine the color(s) and/or pattern(s) of Merchant's products. Although the image processing is described herein with the IMS data feeds 505, it is appreciated that the image processor 180 performs similar analysis on the SCM data feed 515. The image processor 180 stores the universal color code obtained as a result of the analysis as color data in the color database 208. That is, the image processor 180 extracts color information from the IMS data feed 505 to codify or map the Merchant's product color (i.e., Merchant's color swatch) to a universal color code. As shown in FIG. 5, at step 551, the server processor 110 receives a color swatch or image of the product as a normalized data input from the Merchant's IMS 500, preferably via the middleware engine 520. The image processor 180 buffers the color swatch at step 552 and divides the color swatch into a plurality of sub-images to determine the dominant colors at step 554. Thereafter, the image processor 180 determines the dominant color(s) of each sub-image at step 556 to assign a numerical color value, preferably, a hexadecimal value, to the color swatch. The image processor 180 also determines and stores a color histogram and statistical data that may include detailed RGB band information, including the mean, standard deviation and minimum value and maximum value associated with each of the RGB bands, at step 558.

Figure 19:
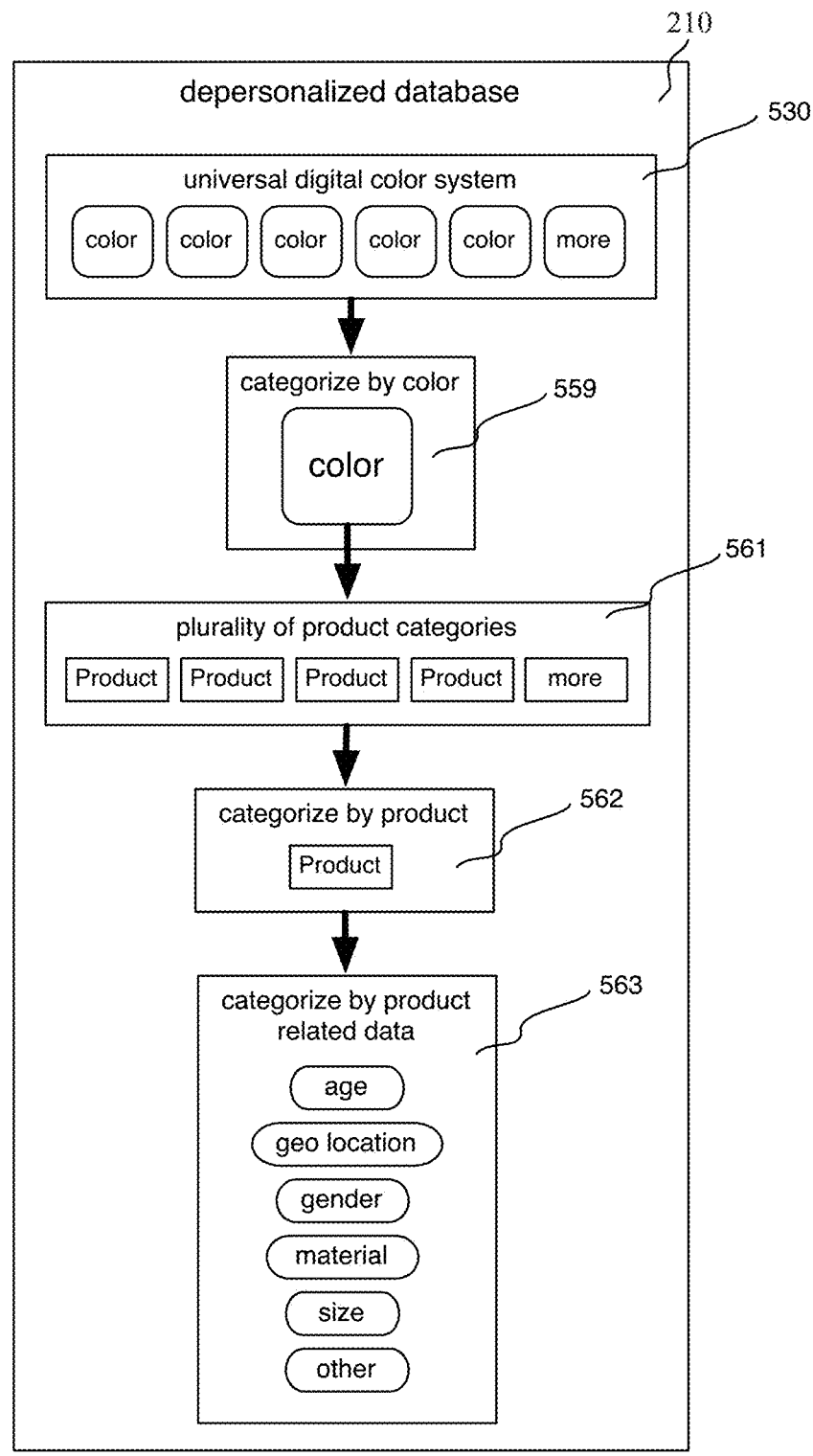
FIG. 19 is an exemplary flow chart depicting an exemplary dynamic process of categorizing a merchant's color system to the claimed single universal color language/system by color, product category and depersonalized product related data in accordance with an exemplary embodiment of the claimed invention.
Figure 20:
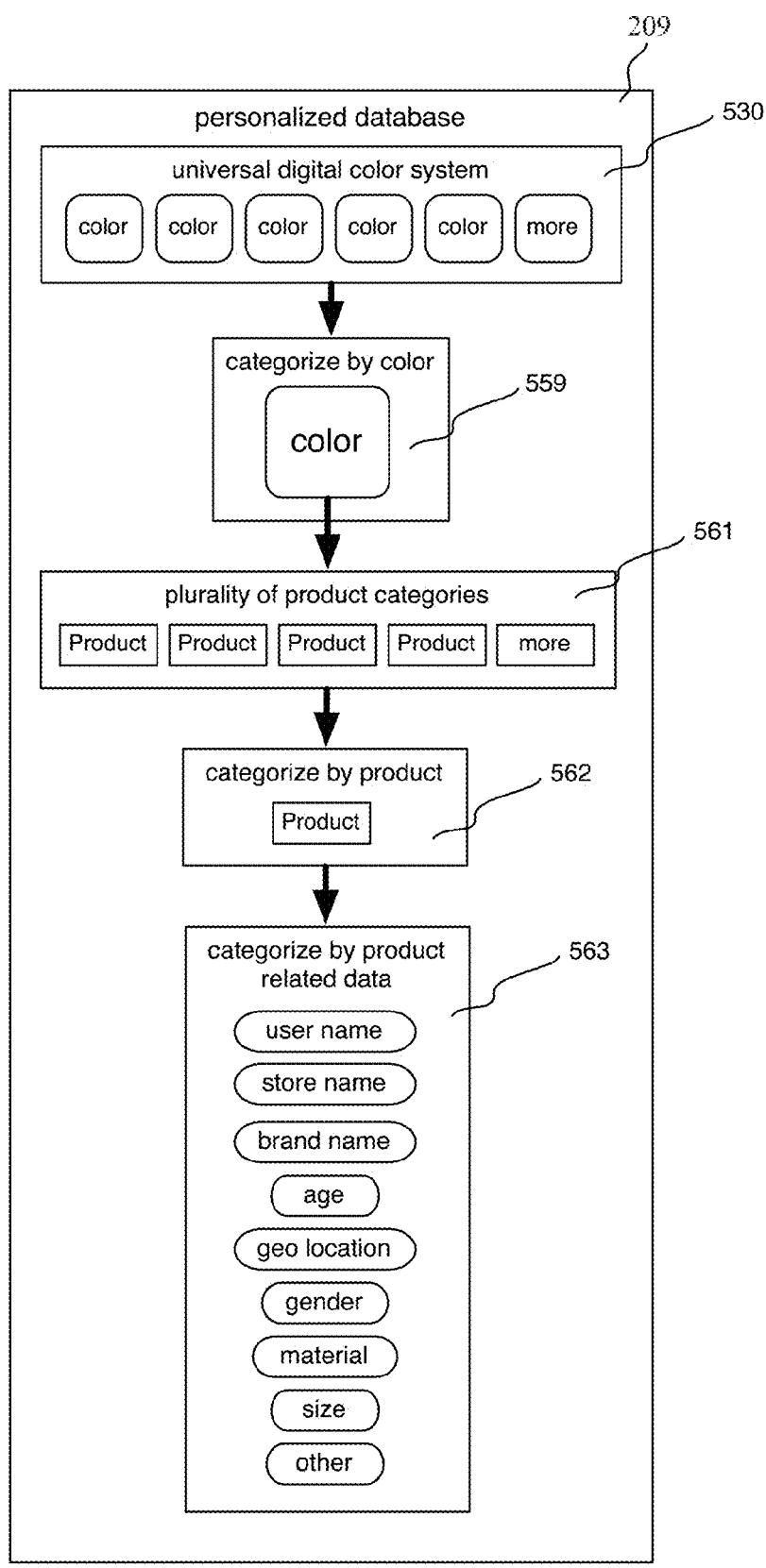
FIG. 20 is an exemplary flow chart depicting an exemplary dynamic process of categorizing a merchant's color system to the claimed single universal color language/system by color, product category and personalized product related data in accordance with an exemplary embodiment of the claimed invention.

In accordance with an exemplary embodiment of the claimed invention, the image processor 180 categorizes products associated with the analyzed color swatch of the Merchant's product, at step 559. That is, the image processor 180 categorizes Merchant's products by color, preferably by the hexadecimal color code or value of the universal color language/system. As exemplary shown in FIGS. 19-20, the product categorization engine 190 of the server 100 determines the product category of the color analyzed product, e.g., clothing, furniture, car, etc., at step 561, and categorizes the color analyzed product by product category based on the product information retrieved or received from the data warehouse 200 and/or the IMS 500 and/or SCM systems 510, at step 562. The source of the product information can be from the specification sheet, which can include product specification, product category, color range, etc. For normalized data feed, the source of the product information can be from the formatted specification sheet. In addition or alternatively, the product categorization 190 may utilize the image processor 160 to analyze the product image to determine the product category. The product categorization engine 190 can further categorize the color analyzed/categorized product by other personalized or depersonalized product information or product related data at step 563. The product categorization engine 190 categorizes based on such depersonalized information as size, material, price, geographical location of the product, etc. or based on personalized information such as user name, store name, brand name, age, gender, etc. It is appreciated that the personalized information can include one or more of the depersonalized information. Accordingly, the data warehouse 200 contains products categorized by color, products and other personalized and/or depersonalized product related data, thereby facilitating dynamic color search based on a universal color language/system.

While swatches or images that contain a single dominant color are easier to classify by color, there are many instances where the image processor 180 must parse an image to make accurate color and/or pattern determinations. The dynamic image analysis of Merchant's color swatches or images with multi-colored patterns can be resource intensive for the image processor 180 to extract the necessary color information. Depending on the volume of images received from the Merchant's IMS 500 and/or the Merchant's SCM system 510, a dynamic resource server or a cluster of dedicated servers 100 may be required to provide the necessary computational power, memory and storage to normalize, analyze and codify the IMS data feeds 505 and/or SCM data feeds 515 containing these images or color swatches.

Figure 9:
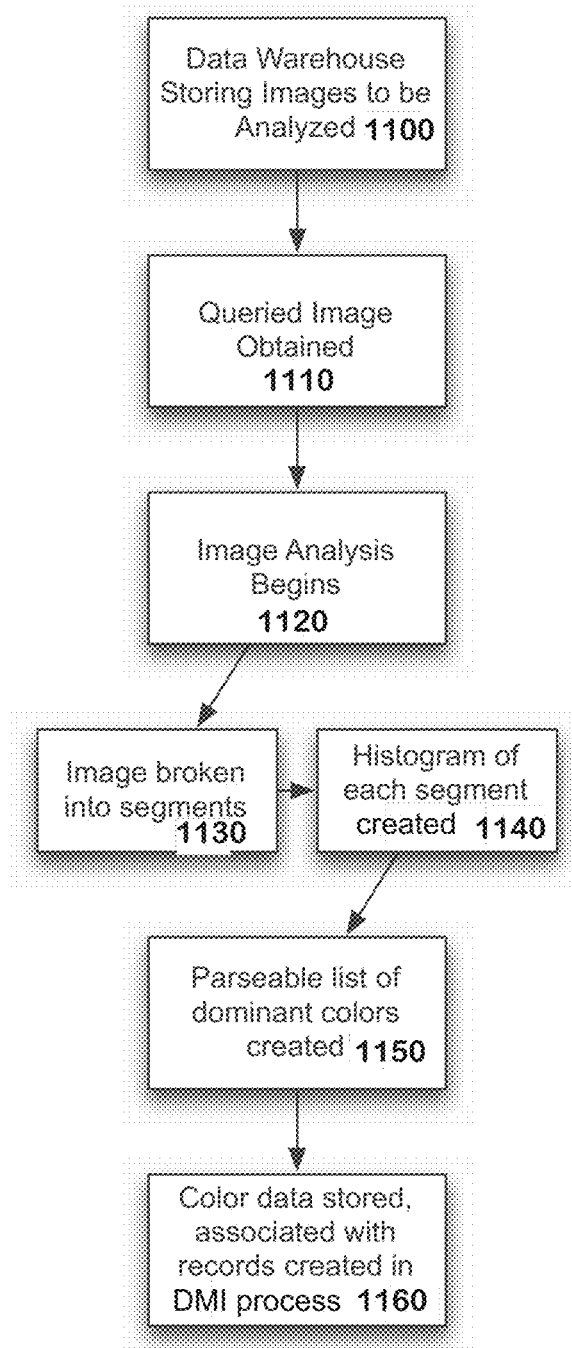
FIG. 9 is a flow chart depicting an exemplary process for extracting color data by segmenting the product image into a plurality of regions in accordance with an exemplary embodiment of the claimed invention.

In accordance with an exemplary embodiment of the claimed invention, the color engine 550 or image processor 180 segments, breaks or divides the image into a digestible format, e.g., four or more sections or quadrants. As exemplary shown in FIG. 9, the middleware engine 520 stores ingested images from the outside feed, such as the IMS feed 505 and/or the SCM feed 515, in the data warehouse 200 at step 1100. The color engine 550 obtains stored image from the data warehouse 200 at step 1110 and performs dynamic image analysis 560 to determine colors, preferably, dominant colors, of the image at step 1120.

Figure 10:
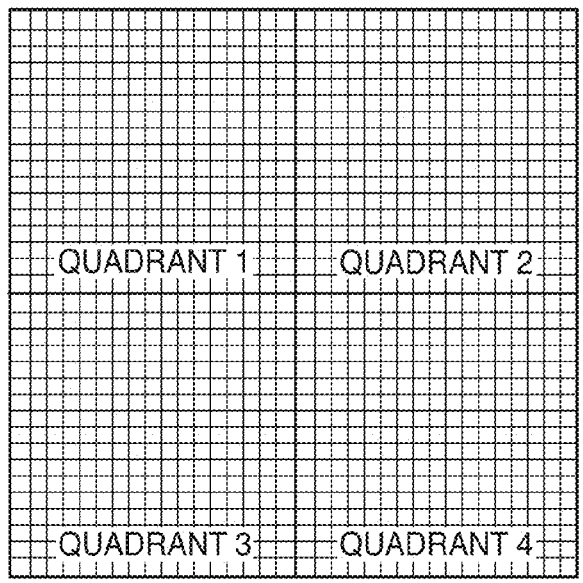
FIG. 10 illustrates an exemplary four-quadrant framework, each subdivided into a 16×16 grid into which a swatch or image is divided for processing by the color engine in accordance with an exemplary embodiment of the claimed invention.

The image segmentation processor 920 segments the retrieved image into a plurality of regions at step 1130 and the dominant color processor 930 analyzes each region to generate a color histogram for each region at step 1140. Typically, the size of images contained in Merchant's IMS data feed 505 and/or Merchant's SCM data feed 515 are known. For unknown image size, the middleware 520 or the image segmentation processor 920 can modify or resize the image to a predetermined size, such as 500 pixels by 500 pixels, thereby normalizing the image size for efficient and uniform image processing. As exemplary shown in FIG. 10, the image segmentation processor 920 can segment or divide the image into a four-quadrant grid, each grid subdivided into 16×16 cells, and analyzes the subdivided image to determine the dominant color(s) and/or pattern(s) of the image. As each quadrant is analyzed, the dominant color processor 930 updates and reassess the resulting data to adjust its determination of the dominant color(s) and/or pattern(s) of the color swatch or image. From the color histogram, the dominant color 930 generates a parseable, ordered list of colors ranking the most dominant colors in each segment at step 1150.

In accordance with an exemplary embodiment of the claimed invention, the image segmentation processor 920 may perform successive subdivisions such that a given cell or sub-image may be further divided or segmented into another grid, or another set of sub-images. Successive segmentations of images may be necessary for the dominant color processor 930 and/or pattern identification processor 940 to analyze and classify complex patterns or images with various combinations of colors and patterns. Preferably, the image segmentation processor 920 further segments the image by reducing the image segment height by half and/or the image segment width by half if it cannot determine the dominant color within a predetermined threshold, e.g., 80% accuracy or certainty. Such determinations are made by determining and analyzing the frequency, quantity, and repeat of colors and/or patterns within the image by the image analytics server 900. Accordingly, in addition to color determination, the image analytics processor 900 isolates, analyzes and identifies patterns in the image, such as striped, plaid, paisley, polka dot, floral, etc. The divided parts/sections of the image are "read" and analyzed by the image analytics server 900 to determine the dominant color(s) and pattern(s) appearing therein.

In accordance with an exemplary embodiment of the claimed invention, the dominant color processor 930 determines the dominant color by identifying the color values across all pixels in each of the cells of the grid, including mean values and standard deviations. In a basic example where an image or color swatch contains only one color and no pattern, the dominant color processor 930 identifies the image based on the color appearing most frequently across all cells and assigns the hexadecimal value (and/or RGB values) associated with the identified color to the image. That is, the dominant color processor 930 compares the ordered lists of dominant colors and determines the most dominant color(s) within the entire image to be the color(s) that appear in the majority of segments with the highest frequency at step 1150. The dominant color processor 930 associates and stores the dominant colors determined for the product corresponding to the analyzed image and other color data, such as the ordered list of dominant colors in the data warehouse 200 at step 1160. The image analytics server 900 dynamically converts the determined dominant color(s) for the product image into the universal hexadecimal color language/system. It is appreciated that the claimed system can also utilize other color models, such as HSV (hue, saturation, value), HSL (hue, saturation, lightness), CMYK (cyan, magenta, yellow key). The image analytics server 900 applies a curve to color histogram to allow for luminance variance in the extracted RGB colors, e.g., 5-15% color variance along each of the bands when determining color dominance in a particular image. This allows for color variations in an image that are based on lighting conditions and shading, but not due to the presence of a different color in the image. Preferably, the dominant color processor 930 eliminates background noise (flat colors) that is not related to the object contained within the image, such as white background. Of course, it should be understood that the dominant color processor 930 can utilize a similar process to determine that multiple dominant colors are present in a single image, particularly when there are stark color contrasts in an image and increased frequency of two or more distinct colors.

Figure 11A:
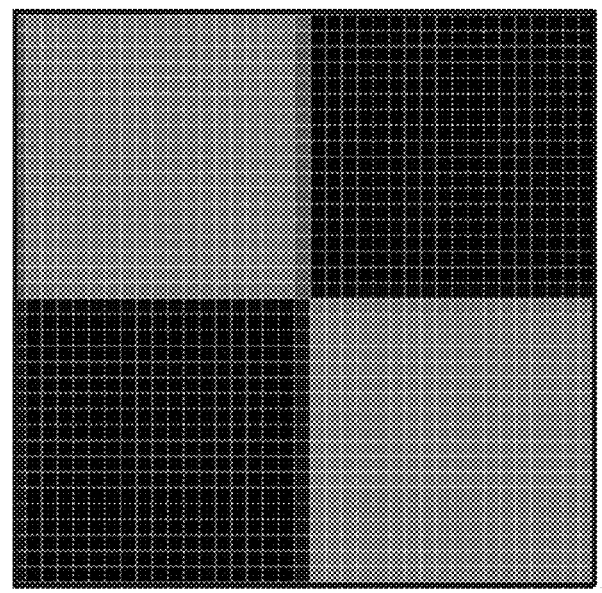
FIG. 11a illustrates an exemplary grayscale representation of a red and black checkered pattern for color and pattern recognition by the color engine in accordance with an exemplary embodiment of the claimed invention.

With respect to pattern recognition, the pattern identification processor 940 analyzes the product image for any potential patterns when the dominant color processor 940 detects multiple dominant colors in the image segment. The pattern matching process will be described herein using a basic plaid pattern as shown in FIG. 11a. Prior to assigning a universal hexadecimal value to the pattern or its constituent colors, the pattern identification processor 940 compares and matches the pattern to a predefined set of patterns maintained in the core color database 570. For example, the predefined set of patterns can include but is not limited to plaid, striped, paisley, polka dot, floral, etc. The pattern identification processor 940 analyzes and processes product images to associate the patterns to each product. Preferably, the claimed invention incorporates sub-classifications of each of the patterns to provide more robust classification. In this instance, a red and black plaid pattern is presented to the image analytics server 900 for pattern and color determination. When analyzing the pattern, the pattern identification processor 940 determines the proximity and repeated frequency of two or more colors. For example, where the first color that is detected in a 3×3 pixel/unit square is next to another color that is detected in a 3×3 pixel/unit square, then followed by the first color in the same configuration, the pattern identification processor 550 determines and classifies the pattern as a plaid pattern and assigns a "plaid" value to the image. After the pattern is defined and classified with a pattern value, the dominant color processor 930 identifies the colors detected within in the pattern (in this case a checker pattern). Thereafter, the matched color processor of the color system database server 950 assigns universal hexadecimal values corresponding to the dominant red and black colors appearing in the image.

Figure 11B:
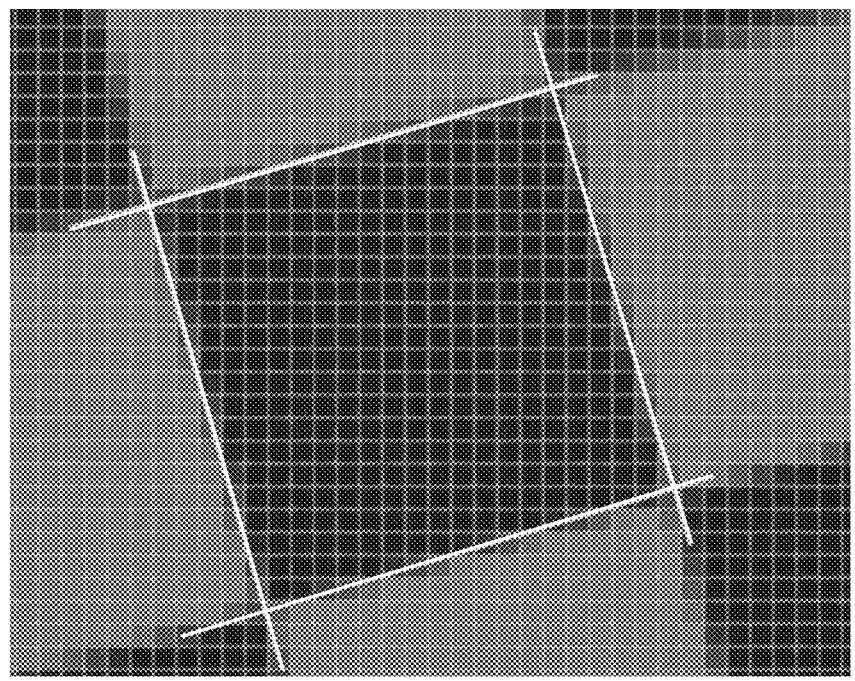
FIG. 11b illustrates an exemplary grayscale representation of a rotated red and black checkered pattern for color and pattern recognition by the color engine in accordance with an exemplary embodiment of the claimed invention.

In accordance with an exemplary embodiment of the claimed invention, the pattern identification processor 940 can account for patterns that are rotated within the processed image, as shown in FIG. 11b. Even though the border between the red and black colors is jagged when the image is processed, the pattern identification processor 940 processes the borders as a straight line with a 90 degree angle separating the edges of the same color. With that information, as with FIG. 11a, the pattern identification processor 940 analyzes and determines that the image pattern as a red and black plaid pattern by comparing the image pattern to the pre-stored patterns in the color database 208.

In accordance with an exemplary embodiment of the claimed invention, the pattern identification processor 940 can account for patterns that are distorted or stretched within the processed image. The pattern identification processor 940 divides the distorted image further into smaller areas until it recognizes a pattern as being a red and black plaid pattern by comparing the image pattern to the pre-stored patterns in the color database 208. The number of regions in the initial or later division(s) may be based on the digital size of the image or swatch, on a defined quantity, historical analysis or another conventional basis well known in the field of image recognition.

In accordance with an exemplary embodiment of the claimed invention, the color engine 550 or the image processor 180 performs successive subdivisions of a given image or swatch to formulate a more precise representation of the color and pattern values which are present in the image. Without this process, an average color value of an entire image still can be determined. However, the color value associated with the image would in many instances be an extremely poor representation of the actual colors in the image and of the product therein. For example, where a given image contains many different colors, the average color value of the entire image may yield a grayish tone as opposed to various distinct colors that formulate the image. Thus, the color engine 550 or the image processor 180 subdivides the image and analyzes each subdivided section independently from the others to capture the various dominant colors of the image. In accordance with an exemplary embodiment of the claimed invention, the color engine 550 or the image processor 180 subdivides the images into arrays of cells to accurately and precisely represent the color values (e.g., color histogram and color statistics) of the image.

Figure 11C:
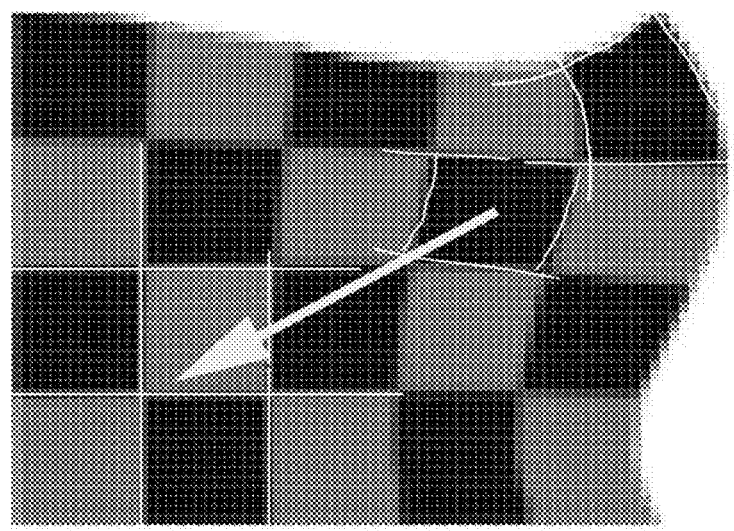
FIG. 11c illustrates an exemplary grayscale representation of a partially distorted red and black checkered pattern for color and pattern recognition by the color engine in accordance with an exemplary embodiment of the claimed invention.
Figure 12:
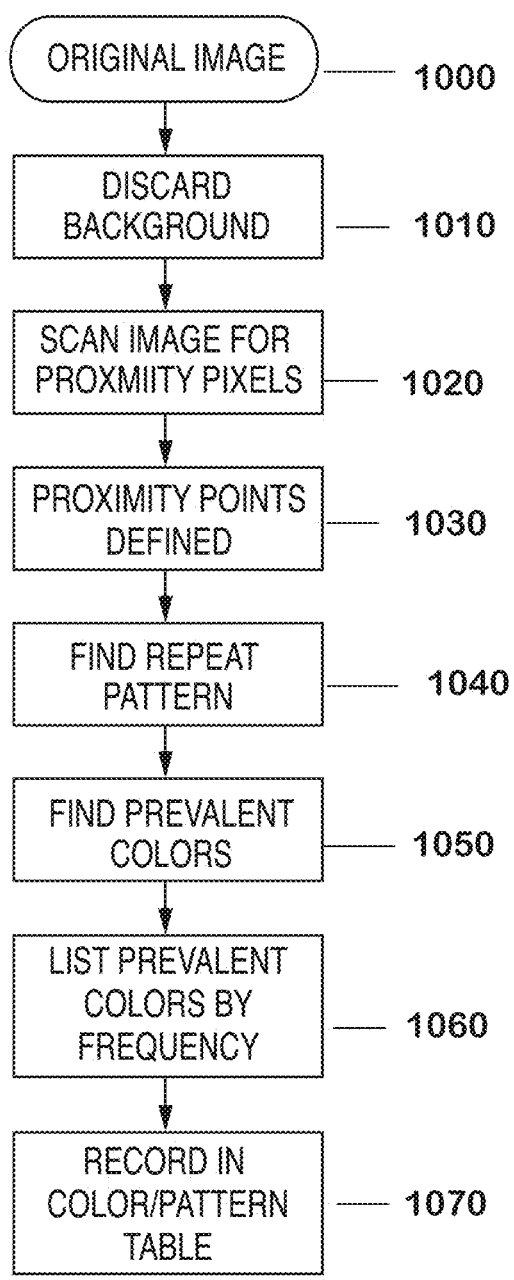
FIG. 12 is a flow chart depicting an exemplary process for identifying and recognizing color(s) and/or pattern(s) by the image processor in accordance with an exemplary embodiment of the claimed invention.

Turning now to FIGS. 8a-8g and 12, in accordance with an exemplary embodiment of the claimed invention, the image processor 180 or the color engine 550 normalizes and codifies colors and patterns from digital photographic images or swatches of products received from the Merchant IMS 500 and/or the Merchant SCM system 510 into a universal color language/system, thereby enabling dynamic analysis of products based on colors and other parameters. The color engine 550 receives a digital photographic image or swatch of a shirt with patterns for processing and recognition at step 1000. The color engine 550 isolates or extracts the relevant product pattern and color from the rest of the image, with the irrelevant portion of the image being deemed background or "whitespace" and discarded at step 1010. The color engine 550 scans the image for proximity pixels at step 1020 and defines proximity points at step 1030. Once the proximity points are defined, at step 1040, the color engine 550 searches the image for a repeat pattern in the product-utilizing pattern repeat parameters defined in the color database 208. Depending on the extent of pattern distortion of the product appearing in the image, as discussed herein with respect to FIG. 11c, the color engine 550 further subdivides the image until it can identify and determine the repeat pattern of the product.

In accordance with an exemplary embodiment of the claimed invention, the pattern identification processor 940 compares the repeat pattern to the predefined set of patterns stored in the color database 208 to classify or determine the product pattern. Once the pattern is classified, the dominant color processor 930 categorizes or determines the prevalent or dominant colors of the product at step 1050. The matched color processor 960 codifies or converts the identified colors into the hexadecimal values of the universal color language/system and preferably, lists the identified colors by its prevalence or frequency (i.e., the number of times a particular color appears in the product image), as exemplary shown in FIG. 8g, at step 1060. For example, the dominant color processor 930 and the matched color processor 960 can identify the following five dominant colors represented by their universal hexadecimal values CB93B1, BDCADC, C3AECD, E3CFCD and EFEBE2. After all of these colors and the pattern are identified, the color engine 550 associates the identified colors and/or patterns with this particular shirt and stores these codified color and pattern data as the product data 206 in the data warehouse 200.

When analyzing patterns of multiple colors, the color engine 550 identifies colors by sampling selected spots in a given region of the image. When the sampling indicates that more than one color might exist, the color engine 550 further samples and/or further subdivides the image, and may continue the process iteratively until only one color is identified in the subdivision or the image subdivision is reduced to a single pixel. In accordance with an exemplary embodiment of the claimed invention, the image segmentation processor 920 selects the sizing or subdivisions based on the number of colors identified in a region, the deviation of values of the colors in a region (as compared to a predetermined threshold), or some other criteria. The dominant color processor 930 analyzes each region's color values, for example on a pixel-by-pixel basis. In addition, the image analytics server 900 stores each sampled location of each region by its X, Y coordinates relative to the entire image (together with its color values), and each region is assigned one or more color values based on the color determination. Further, the dominant color processor 930 instructs the color engine 550 to search for pattern(s) in the image. The color engine 550 can recognize a change in color when a certain parameter changes by more than a fixed threshold, such as 15%. As a result, the color engine 550 can built a virtual map which depicts colors in positions to indicate where color changes occur and, in aggregate, a pattern can emerge. By identifying each region's color and the location of each region relative to the entire image, the color engine 550 can determine patterns, for example, using pixel geometry techniques that are known in the art. Once the patterns and colors are determined, the color engine 550 assigns identifying numerical values. Preferably, the color engine 550 provides a lesser weight to background colors of white or black.

Once the color data for the color swatch, in accordance with an exemplary embodiment of the claimed invention, the color engine 550 or the image processor 180 associates or maps the color swatch to one of the 4096 universal hexadecimal codes based on Euclidian distance between the determined color of the image and the claimed universal color language/system. The determined value of the image is compared to all of the values of the universal color language/system to reverse map the color (e.g., the Merchant's product color). Preferably, the color engine 550 or the image processor 180 compares the determined value to each of the 4096 hexadecimal colors/values/codes of the claimed universal color language/system and determines the Euclidian distance between the determined value of the image and each hexadecimal code. The matched color processor 960 of the color system database server 950 assigns the image the hexadecimal code yielding the lowest Euclidean distance and associates the hexadecimal value and the corresponding Euclidean distance with the image in the data warehouse 200.

Where the determined color from the image analysis 560 is not precisely the same as one of the universal colors (i.e., one of the 4096 colors) in the color database 208, the matched color processor 960 selects a candidate color that is the closest one of the available colors in the color database 208. In accordance with an exemplary embodiment of the claimed invention, the matched color processor 960 determines the candidate color by using the following formula $c=\sqrt{(r-r_1)^2+(g-g_1)^2+(b-b_1)^2}$, wherein c=closest color; r=first red value; $r_1$=second red value; g=first green value; $g_1$=second green value; and b=first blue value $b_1$=second blue value. Using component RGB values for the candidate colors and known color from the processed image, the closest candidate color to the known color present in the processed product image is the color that yields a value where c is closest to 0. (A value of c=0 means that the colors are the same.)

Once a candidate color is selected as a result of the image analysis 560, the color engine 550 generates a record in a color-pattern table 580 at step 1070 which utilizes a unique item or product ID of the product listed in the item table 540 to link a given product provided by the IMS feed 505 and/or the SCM feed 515 to the hexadecimal code of the candidate color in the color pattern-table 580. That is, the color engine 550 syncs the normalized and converted color data of the IMS data feeds 505 and/or the SCM data feeds 515 into the universal hexadecimal color codes, thereby establishing a universal color code or identifier for each product that was input into the server 100 from the Merchants' IMS 500 and/or the Merchants' SCM systems 510. The product categorization engine 190 determines a product category of the product associated with the normalized and color categorized/converted product data (i.e., color analyzed product) and categorizes the color analyzed product into the determined product category at step 565. This advantageously enables the claim system to normalize, categorize, codify, search and dynamically analyze products from a plurality of Merchants by color rather than by text. That is, the claimed invention reverse maps various Merchant color systems into one universal color language/system.

In accordance with an exemplary embodiment of the claimed invention, the image processor 180 or the color engine 550 reverse maps the current and non-uniform color conventions and identifications of Merchants without fundamentally damaging or totally eliminating those Merchants' own color-naming preferences. The matched color processor 960 converts the RGB value to the closest matching hexadecimal value within the universal color language/system to reverse map the Merchant's product colors to the universal hexadecimal codes of the claimed invention. In accordance with an exemplary embodiment of the claimed invention, the image processor 180 or the color engine 550 converts using a proximity numerical search to locate a single color in the universal color language/system that most closely matches the three RGB values of the image. In addition to the claimed color classification of identifying colors by hexadecimal or RGB codes, e.g., hexadecimal code FF0066 corresponding to the RGB code (255 Red, 0 Green, 102 Blue), the color may also be identified in the data warehouse 200 and/or Merchant database using the Merchant's unique color name or alias, e.g., "flamingo pink." Likewise, other Merchants that wish to assign their own alias to that very same color may do so using a different name. Regardless of the number of aliases applied to the particular color, the key is that all are codified and searchable using the standardized hexadecimal and/or RGB values assigned to the color.

By reverse mapping all major Merchants' color systems into a single universal color language/system, a significant hindrance to user searching for and finding products from different Merchants is resolved. Reverse mapping enables dynamic analysis and codification of precise color. When layered into proprietary Merchants' IMS 500 and/or Merchants' SCM systems 510, the search is further enhanced as it is no longer requires scraping the Internet. Likewise, issues associated with Merchant product planning and production is ameliorated by providing them with standardized color information on sales, searches and availability.

Figure 7:
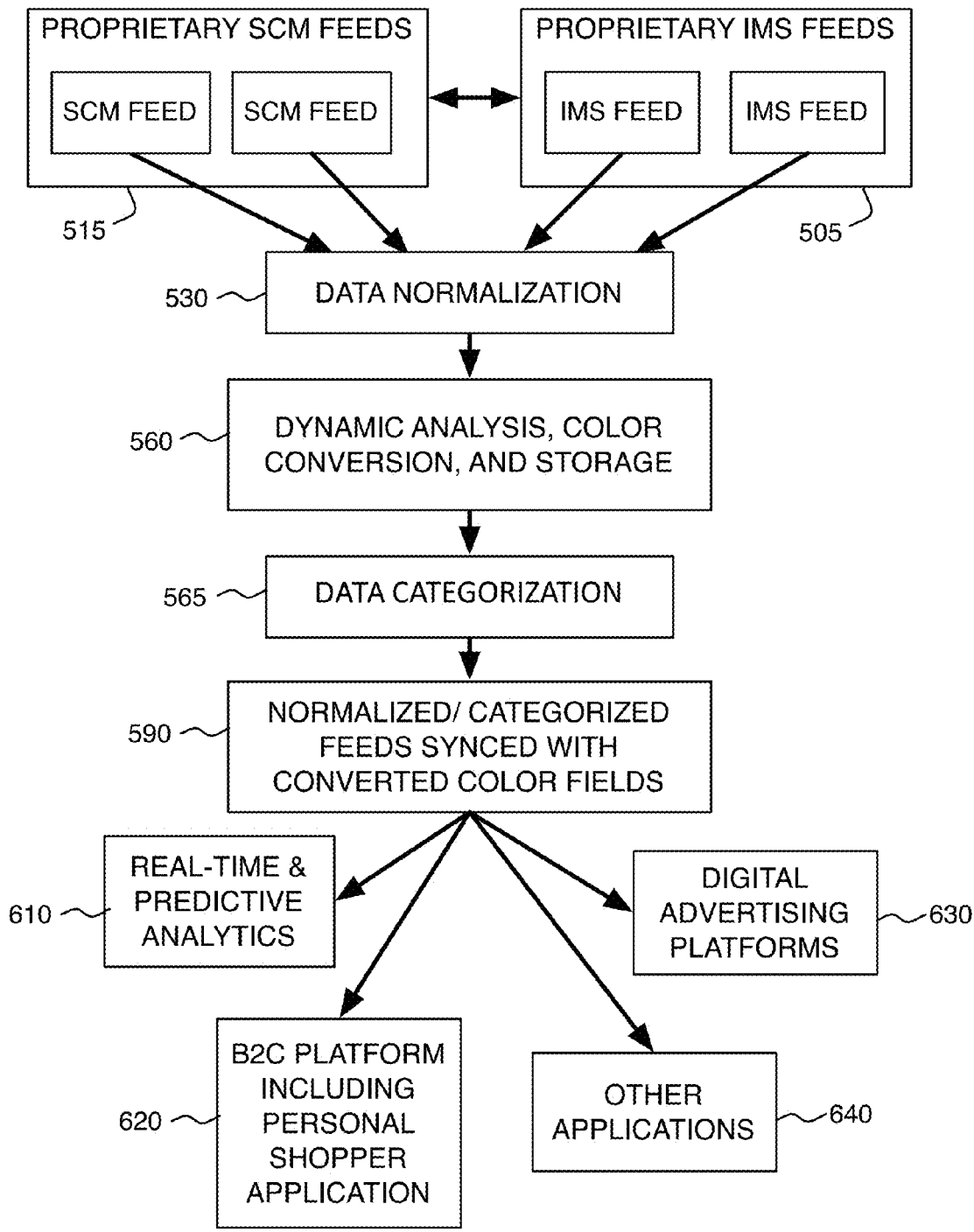
FIG. 7 is a flow chart depicting an exemplary process for normalizing, categorizing and codifying divergent colors from a plurality of Merchant IMS/SCM systems into a single universal color language/system in accordance with an exemplary embodiment of the claimed invention.

Following the consumption of normalized and categorized data from the ISM data feeds 505 and/or the SCM data feed 515, and color assignment utilizing universal hexadecimal color identifiers, as exemplary shown in FIG. 7, a number of Merchant tools are enabled which pertain to predictive analytics 610, a B2C platform which includes a digital personal shopper application 620, advertising to consumers 630 and other applications 640. Notably, these tools leverage the ability of the system to capture codified color data from a plurality of customized proprietary IMS and SCM systems 500, 510 previously unavailable in the prior art.

Upon following an acceptable format and input of information, the SCM data feeds 510 are transmitted and loaded onto server 100 by the Merchant's SCM system 510 as soon as the product goes into production. As products are manufactured and are ready to enter inventory, the databases in the Merchant's SCM systems 510 and/or the Merchant's IMS 500 are updated to reflect available inventory of product, resulting in additional data being sent from the SCM systems 510 and/or IMS 500 to the server 100. In accordance with an exemplary embodiment of the claimed invention, once products enter Merchant inventory, events are triggered to issue and release targeted advertisements, digital catalogues and other marketing tools to connect now-available products with consumer users. Where there are delays in production of product of a certain color, the SCM feeds 515 and/or the IMS feeds 505 are likewise updated, which may trigger other advertising events. As available products are sold, the IMS 500 continue to be updated, with corresponding data being sent to the server 100. While the example herein references information initially input and fed to server 100 via the supply chain, it should be appreciated that information may be fed to server 100 utilizing inventory management information that typically relates to the post-production status of product.

In the examples presented above, colors are determined and classified in 6-digit hexadecimal values or hexadecimal code. However, it should be understood that the available colors for classification can be adjusted to correspond to an expandable or fixed color environment. For example, in an expandable environment of colors, a color in a given image is assigned a 6-digit hexadecimal value (and corresponding RGB values) that corresponds to one of the 4,096 selectable values but can expand to include additional colors as needed. The assignment of the 6-digit hexadecimal value (and corresponding RGB values) enables expansion if additional colors are desired beyond 4,096 through the 16+ million colors that are actually available. It should be appreciated that each hexadecimal code can be converted into component RGB values and/or a binary representation.

In a fixed environment of 4,096 colors, each of the component RGB colors presented on a scale of 0 to 255 can be adjusted downward to 16 intensities of RGB, respectively, on a scale of 0-15. Based on the 16 color intensities of each of these colors, a total of $16^3$ or 4096 colors variations are possible. For example, the color identified in hexadecimal code as CB93B1 and corresponding RGB values: 203 Red: 147 Green: 177 Blue could be adjusted on a 4096 color scale to hexadecimal code C9B and corresponding RGB values: 13 Red: 9 Green: 11 Blue, by using the closest values on the 16-level RGB scale. On this form of scale, these values would be associated with a product, such as a shirt, to which the image or color swatch belongs such that when a query for color C9B is made, one of the recommendations and or product results is the shirt. While utilizing only 16 RGB intensities (and 3 hexadecimal digits) does not easily lend itself to color expansion, it still permits a fair level of color variance sufficient for consumer and Merchant classification. The full 4096 hexadecimal codes of the claimed invention is more fully set forth and described in applicant's co-pending application Ser. Nos. 13/762,160 and PCT/US123/25135 (hereinafter "applicant's '160 application"), each of which is incorporated herein by reference in its entirety.

All user subscribers (e.g., Merchant users, consumer users, etc.) gain entry and access to the server 100 by subscription and by using known security approaches, such as a login and password, which are optionally managed by a separate login server (not shown). Once a login is confirmed and a subscriber is authenticated, the processor 110 of the server 100 loads a user's age, gender, location and other demographic information from the user database 202. The color search engine 120 of the server 100 provides the verified consumer user access to the search query functions 730 via a graphical user interface (GUI) 700 and the processor 110 of the server 100 provides the verified Merchant user with access to additional data available to them under its subscription. Unlike the consumer user/subscriber, the Merchant user/subscriber can search the SCM systems 510 to determine the production status/schedule of a particular product and/or to examine/verify the color and specification of the components of the product before moving forward with the production of the product.

For an unauthorized user or non-licensee of the service provider, when the client device 300 associated with the unauthorized user (i.e., non-subscriber) attempts to access the server 100, in accordance with an exemplary embodiment of the claimed invention, the processor 110 denies the client device 300 access to the server 100 and transmits a registration webpage to the client device 300 so the user can subscribe to the services provided by the service provider and become a registered/authenticated subscriber using any known methods. After completing the registration process, the user has an option of downloading a mobile search application onto her client device 300 to seamlessly and/or automatically connect to the service provider's server 100. In addition or alternatively, the server 100 may permit the client device 300 of the unauthorized user to perform at least one color based search as a teaser to encourage the unauthorized user to become a subscriber and subscribe to the service provider's services.

Figure 13:
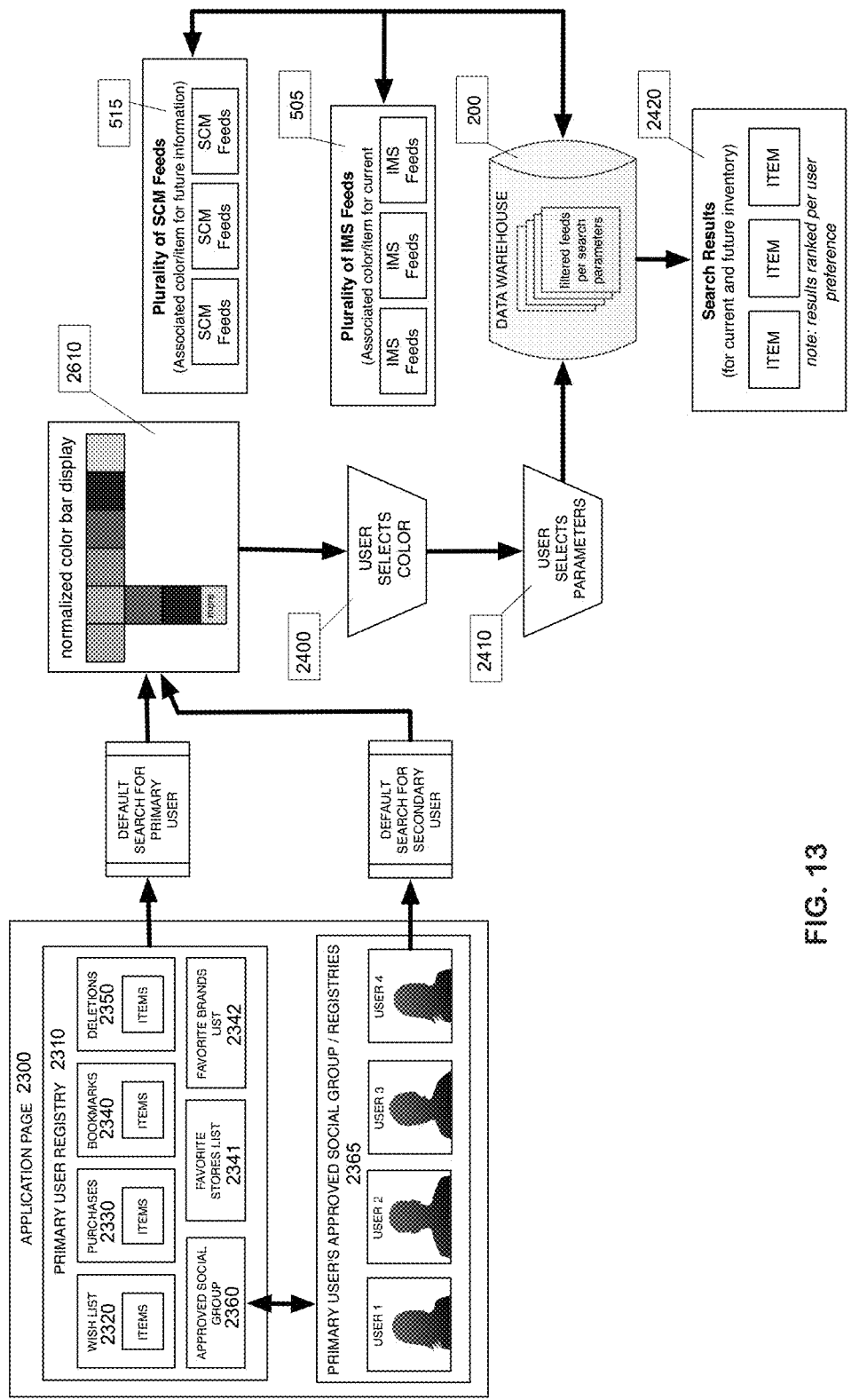
FIG. 13 illustrates an exemplary user registry page and an exemplary flow diagram depicting interaction among various system components to perform color based search for primary and secondary users in accordance with an exemplary embodiment of the claimed invention.
Figure 14:
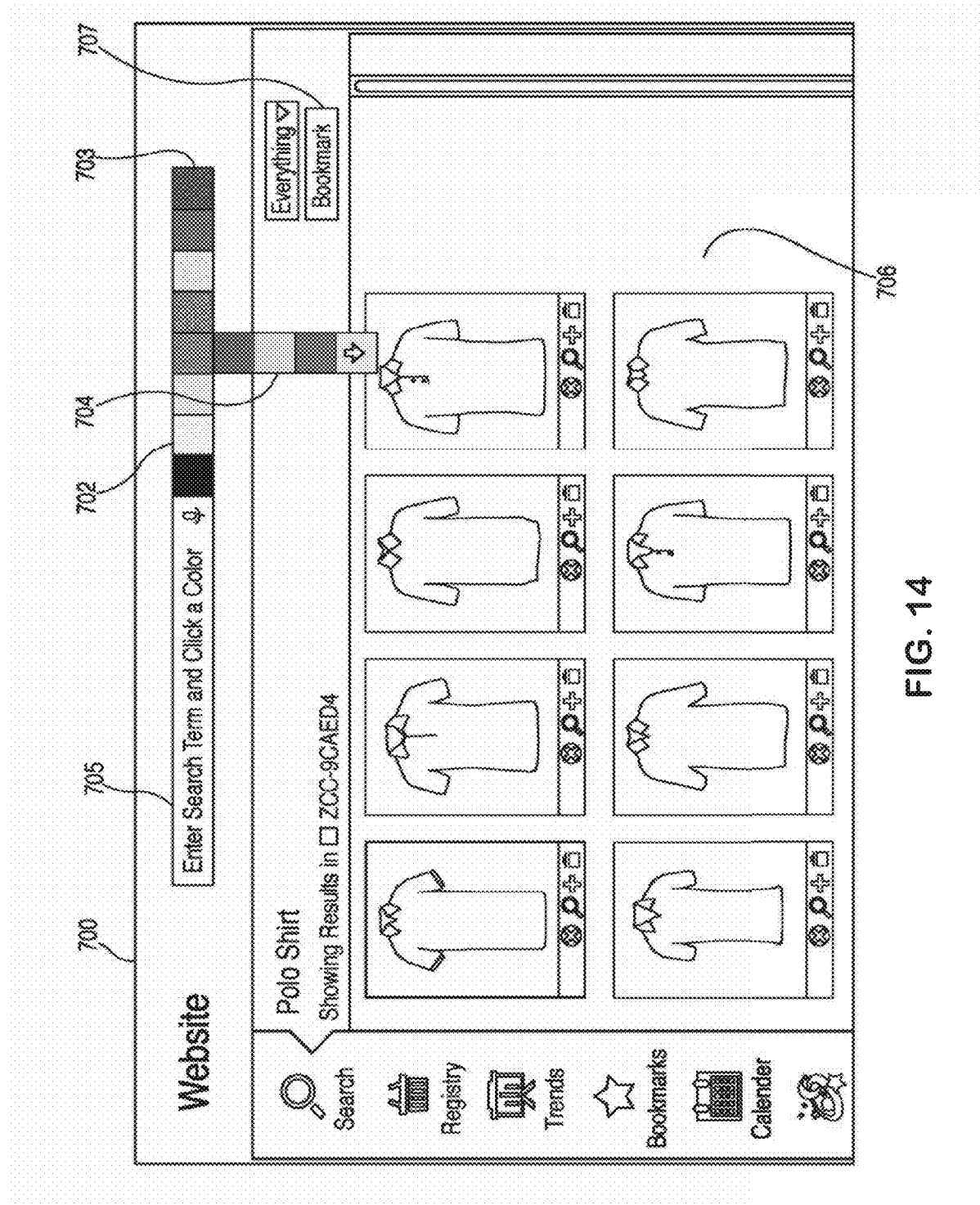
FIG. 14 illustrates an exemplary graphical user interface or display for color search access in accordance with an exemplary embodiment of the claimed invention.

As shown in FIGS. 13 and 14, more fully described in applicant's co-pending U.S. application Ser. No. 14/055,884 and international Application No. PCT/US13/65333 (hereinafter "applicant's '884 application"), the user initiates a color-based search query using the GUI 700 of the color search engine 120 display on the client device 300 associated with the user. By selecting a selectable color area or swatch 702 of the GUI 700, as exemplary shown in FIG. 4, a user initiates a search for products from the data warehouse 200 and/or Merchants' IMS 500 and/or Merchants' SCM systems 510 (collectively and interchangeably referred to herein as the "database engine 250") with the associated digital color codes (e.g., in hexadecimal, RGB, binary) that correspond to the selectable color swatch 702. It should be appreciated that the query or queries sent to the data warehouse 200, to the IMS 500 and to the SCM systems 510 (the database engine 250) is referred to herein as a single query for ease of reference. As exemplary shown in FIGS. 3A-3B, 13 and 14, when a user desires to search for products of a particular color, the user selects a color from one of the selectable color bar colors that appear on the clickable horizontal color bar 703. Once one of the colors on the horizontal bar 703 is selected, a vertical bar 704 expands downward, typically with shades of the initial color selected on the horizontal color bar 703. Once a user makes a final color selection, which make include one or more colors, the client device 300 transmits a color search criteria 730, 2400 to the color search engine 120 of the server 100 over the communications network 400. The color search engine 120 searches the database engine 250 for products matching or closest to the user's final color selection. That is, the color search engine 120 sends the color search criteria 730, 2400 in a query to the database engine 250. It is appreciated that each IMS 500 is associated with a different merchant, retailer, wholesaler, manufacturer and the like, and each SCM system 510 is associated with a different merchant, retailer, wholesaler, manufacturer and the like. It is appreciated that the products can be any goods, including but not limited to apparel, shoes, hats, ties, socks, scarves, fashion accessories, home furnishings, furniture, appliances, bicycles, cars, paints, lipsticks, hair dyes, make-ups, nail polishes and any other product in which is a component.

In accordance with an exemplary embodiment of the claimed invention, the color search engine 120 searches the database engine 250 for products that meet the color search criteria 730, 2400, i.e., the associated digital color code(s) corresponding to the selected color swatch(es) 702. The color search engine 120 transmits the search results 740, 2420 containing information about the products matching the user's color search criteria 730, 2400 to the client device 300 associated with the user over the communications network. The color search engine 120 stores the color search criteria 730, 2400 and the search results 740, 2420 in the data warehouse 200. Preferably, the color search engine 120 updates the user color preference history 2430 based on the user's color search criteria 730, 2400.

However, if no product matching the user's color search criteria 730, 2400 is found in the data warehouse 200, the color search engine 120 searches one or more IMS 500. Preferably, the color search engine 120 transmits a single query comprising the user's color search criteria 730, 2400 to both the data warehouse 200 and the IMS 500 to search both of them simultaneously. If no product matching the user's color search criteria 730, 2400 is found in the data warehouse 200 and the IMS 500, then the color search engine 120 searches the SCM systems 510 to determine if any product matching the user's color search criteria 730, 2400 is in the "supply chain" or the "pipeline" (i.e., the matching product is currently being shipped, manufactured, etc.). The color search engine 120 transmits the search results 740, 2420 comprising future inventory information, e.g., product availability information, to the client device 300 associated with the user over the communications network 400.

In accordance with an exemplary embodiment of the claimed invention, if no product matching the user's color search criteria 730, 2400 is found, then the color search engine 120 returns search results 740, 2420 comprising product(s) with nearly the same or closest color to the queried color of the user's color search criteria 730, 2400. That is, the color search engine 120 returns product with the hexadecimal code of the universal color language/system that is nearly the same or closest to the hexadecimal code of the queried color of the user's color search criteria 730, 2400. In accordance with the exemplary embodiment of the claimed invention, color search engine 120 of the server 100 executes the following exemplary calculation to determine the closest matching color to the queried color: $c=\sqrt{(r-r_1)^2+(g-g_1)^2+(b-b_1)^2}$, wherein c=closest color; r=red value of the queried color; $r_1$=red value of the candidate color; g=green value of the queried color; $g_1$=green value of the candidate color; and b=blue value of the queried color; and $b_1$=blue value of the candidate color. The candidate matching color is the one or more colors that yield the value closest to zero.

Preferences in the color swatches 702 appearing on the color bars 703, 704 may also be controlled and modified via the GUI 700, such as by utilizing the bookmark feature 707. In controlling changes to selectable colors that readily appear on the color bar display 2610 of the GUI 700, the color search engine 120 generates user-specific color bar display 2610 or 2620 based on the user color history, user's purchase history, user's search history and the like. That is, the color search engine 120 displays GUI 700 with the personalized color bar display 2620 instead of the normalized color bar display 2610 on the client device 300 associated with the user after acquiring sufficient data to determine user's color preferences. Alternatively, the color search engine 120 displays the personalized color bar display 2620 when the user clicks on the more button on the normalized color bar display 2610. The user selects one or more colors on the normalized color bar display 2610 or the personalized color display 2620 to search for products in the database engine 250.

In accordance with an exemplary embodiment of the claimed invention, the GUI 700 additionally comprises a textual search field 705 for user to enter additional optional search parameters 2410, such as pattern information, e.g., plaid, and textual search criteria, e.g., size, brand, Merchant, polo shirt, paint, blender, nail polish, etc. The color search engine 120 searches the database engine 250 for products that meet both the textual search criteria 2410 and color search criteria 2400 (i.e., the associated digital color codes (e.g., in hexadecimal, RGB, binary) that correspond to the selected color swatch 702. If no additional search parameters 2410 are provided by the client device 300, then the color search engine 120 searches the database engine 250 for products that meet only the color search criteria 2400, i.e., the associated digital color code(s) corresponding to the selected color swatch(es) 702.

Figure 4:
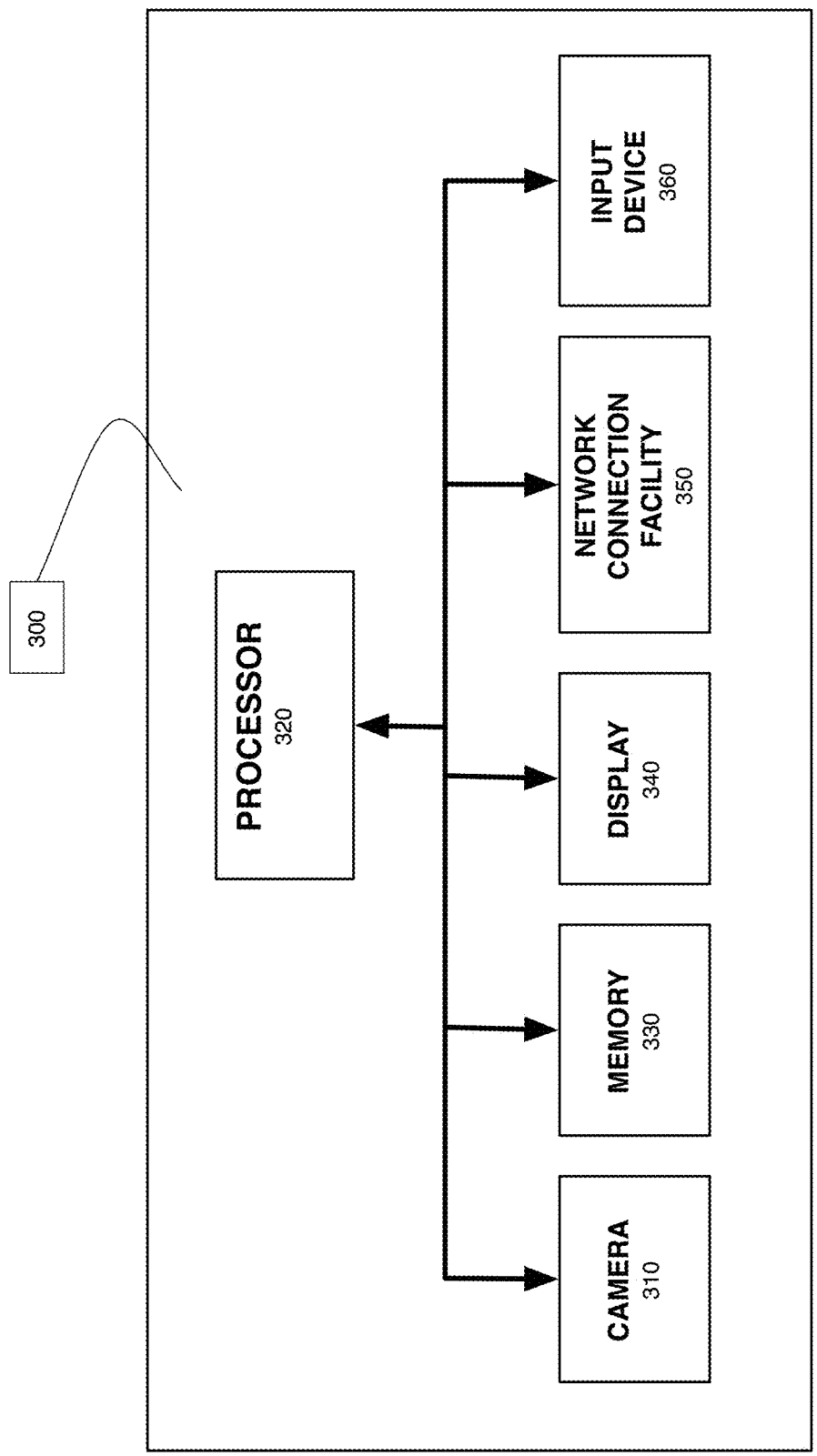
FIG. 4 is block diagram of the client device in accordance with an exemplary embodiment of the claimed invention

When additional search parameters 2410, such as "Polo Shirt" are received from the client device 300 over the communications network 400, in accordance with an exemplary embodiment of the claimed invention, the color search engine 120 provides search results 2420 with products or items from the database engine 250 that meet both the color search criteria 2400 and textual search criteria 2410: a) the hexadecimal color code(s) of the selected color swatch(es) of the color search criteria 2400, e.g., hexadecimal code 9CAED4 as exemplary shown in FIG. 4; and b) the textual search parameter or criteria 2410, e.g., "Polo Shirt" as exemplary shown in FIG. 4. The color search engine 120 transmits the search results 2420 returned by the database engine 250 to the client device 300 over the communications network 400. The client device 300 renders the search results 2420 in a display area 706, as exemplary shown in FIG. 4. Although only eight products are shown in the display area 706 in FIG. 4, additional products of the search results 2420 can be displayed or brought into the display area 706 by using any know methods, e.g., using a slider on the screen or GUI 700.

In addition to receiving results 2420, in accordance with an exemplary embodiment of the claimed invention, the system further provides a user with a number of user actions or options 800 to share the product via a social medium 810 (and to a social database 812), to "like" the product 820, to save the product as a bookmark 830 or into a user registry, to "hide" the product to ensure that it never appears again in a user's search results 840, and to purchase the product 850. When selections are made, they are stored as records in a user history table 860 and conveyed to the real-time analytics processor 170 of the server 100 to analyze and utilize for future recommendations to the user and to others with correlating selections and/or demographics. Thus, information from searches performed by users of available products or merchant inventory is organized and indexed as user data and is used to formulate user preferences that is available to be used for future recommendations to the users providing the data, as well as to other users sharing common user demographics and/or online shopping activities.

In accordance with an exemplary embodiment of the claimed invention, when resources permit, the color search engine 120 queries the database engine 250 continuously and automatically for products with identifying colors that match those colors appearing as selectable color swatches 702 on the user's personalized color bar display 2620. The color search engine 120 receives the search results 2420 from the database engine 250 and transmits the search results 2420 to the client device 300 associated with the user over the communications network 400. The client device 300 populates the display area 706 with the products/items of the search results 2420 before the user initiates a formal search. Preferably, the search results 2420 comprises products/items from the IMS 500 so that the products/items shown in the display area 706 are products/items that are currently available and in stock.

In accordance with an exemplary embodiment of the claimed invention, the user can input additional color search criteria 2400 and/or additional textual search criteria 2410 into the GUI 700 so the color search engine 120 can narrow or filter the search results 2420, for example, to find specific types of products that are currently available for purchase from Merchants within the user's current geo-location. These additional parameters or criteria may include, but is not limited to, a second or third color swatch or hexadecimal code, a specific pattern, or a physical attribute, such as size.

In accordance with an exemplary embodiment of the claimed invention, the user can select one or more of the products displayed on the display area 706 for purchase. The client device 300 transmits a purchase request to the server 100 over the communications network 400 when the user selects a product to purchase from the display area 706. The processor 110 may utilize the user's shipping and billing information stored in the user database 202 to process the user's purchase of the product. In addition or alternatively, the processor 110 may lead the user through a series of GUIs displayed on the client device 300 to input the required billing and shipping information to complete the purchase. The GUIs can be either linked through the provider's server 100 or through a Merchant's website.

In accordance with an exemplary embodiment of the claimed invention, the processor 110 stores the purchased products/items 2330 as purchase records in the user database 202 and stores de-personalized purchased information in the product database 206, e.g., user's gender and demographic information. The real-time analytics processor 170 may utilize such de-personalized information to determine a common or typical profile of users purchasing such a product or to determine color trends based on gender, age, geo-location and the like. If the purchased product is on the user's wish list 2320, then the user module 150 removes or deletes the purchased product from the user's list so that the members of her approved social group 2360 is made aware that an item has been purchased from the user's wish list 2320, thereby decreasing the likelihood of duplicate purchases. Alternatively, the user module 150 may hide the gift purchases from a user's wish list 2320 from the owner of the wish list 2320 to keep any gift purchases secret from the owner.

In accordance with an exemplary embodiment of the claimed invention, the real-time analytics processor 170 couples the demographic data with other data such as, but not limited to, a user's purchase and shopping history, as well as data regarding industry trends and consumer color preferences, so as to algorithmically recommend colors and products to both users and Merchants.

While the embodiments illustrated herein enable a user to search for a plurality of desired colors in one item (e.g., a first color and a secondary color), as well as specific pattern-color combinations (e.g., blue and red plaid), the color search engine 120 can perform other comparable searches on the database engine 250. In accordance with an exemplary embodiment of the claimed invention, the color search engine 120 searches for "complementary" colored items to a queried color or color search criteria 2400. Each selectable color swatch 702 in the color bar display 2610 and the personalized color bar display 2620 is not only associated with a unique hexadecimal code of the universal color language/system but also is associated with hexadecimal code(s) of one or more complimentary colors. Accordingly, when the user selects to include the complementary color search as additional search parameter or criteria 2410 in her search for products, the color search engine 120 searches the database engine 250 for product/items that meet the user's queried color of the color search criteria 2400 and the complementary colors associated with the user's queried color. That is, the search results 2420 comprises a list or set of products/items satisfying the color search criteria 2400 and/or additional textual search criteria 2410, and a list of set of product/items satisfying one or more complementary colors associated with the user's queried color. For example, a given shade of blue complements or "go with" all other shades of blue along with a small sample of shades of red, then the search results 2420 may additionally comprise lists of products/items satisfying the complimentary shades of blue and red accordingly. The color search engine 120 transmits the search results 2420 comprising lists or sets of products satisfying the color search criteria 2400 and the complementary colors associated with the queried color to the client device 300 over the communications network 400. In accordance with an exemplary embodiment of the claimed invention, the color search engine 120 selects the complementary colors that are within a predetermined range of the hexadecimal color code of the queried color 2400.

In addition or alternatively, the user may select to include the complementary colored item search as additional search criteria 2410 in her search for products. The color search engine 120 searches the database engine 250 for product/item to accompany a certain color item. For example, the user may use the color search engine 120 to search for shoes that are complementary to an "olive green" jacket or for curtains that are complementary to a blue and white floral patterned sofa.

In addition to providing the search results 2420, in accordance with an exemplary embodiment of the claimed invention, the processor 110 further provides a user with a number of user actions or options to share the product/item on the search results 2420 with user's approved social group 2360, to add the product/item to the user's wish list 2320, to add the product/item to the user's bookmark 2340, to add the product/item to the user's deleted list 2350 so that the deleted product/item will not be included in any future user's search results 2420, and to purchase the product/item. When selections are made by the user, the color search engine 120 stores the user's selections as records in the user database 202. That is, the color search engine 120 stores the shared products/items as social registry records, wish list products/items as wish list records, bookmarked products/items as bookmark records, deleted product/items as deleted records and purchased product/items 2330 as purchase records in the user database 202. Additionally, the color search engine 120 conveys the user's selections or records to the real-time analytics processor 170 of the server 100 for processing and analysis. The product recommendation engine 160 utilizes the analyzed data for future recommendations to the user and to others with correlating selections and/or demographics. Thus, information from searches performed by users of available products or Merchant inventory is organized and indexed as user data and is used to formulate user preferences that is available to be used for future recommendations to the users providing the data, as well as to other users sharing common user demographics and/or online shopping activities.

Figure 15:
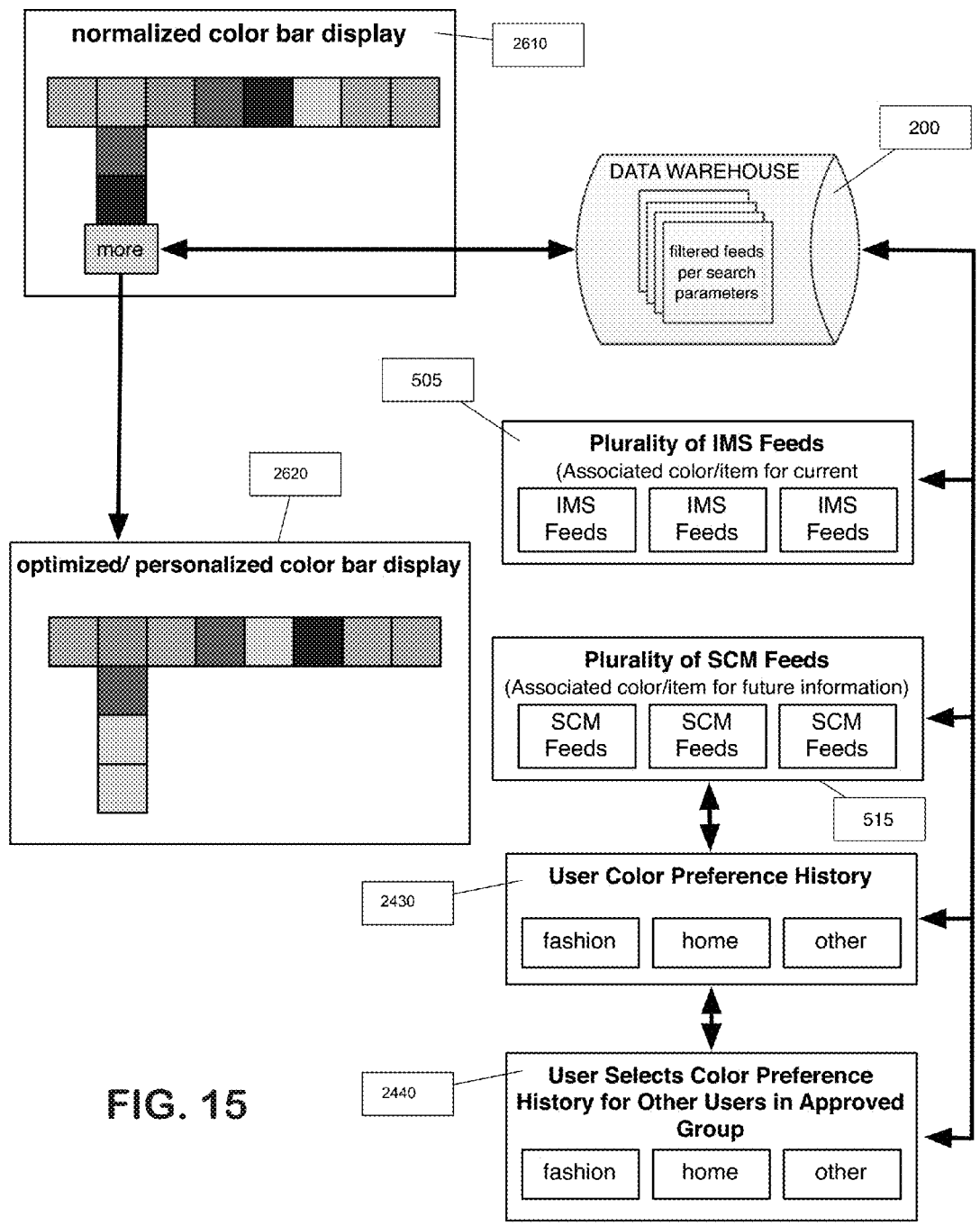
FIG. 15 is an exemplary flow diagram depicting interaction among various system components to perform color based search in accordance with an exemplary embodiment of the claimed invention.

In accordance with an exemplary embodiment of the claimed invention, the color search engine 120 performs product/items searches using the color and/or pattern preferences of the user stored in the user database 202. The user module 150 updates the user's color and pattern preferences (collectively referred to herein as the "user color or preference history 2430") based on one or more of the following: the user's search criteria 2400, 2410; and user's selection of a particular product/item to share with user's approved social group 2360, to add to user's wish list 2320, to add to the user's bookmark 2340, or to purchase. Preferably, the user module 150 categorizes user color preference history by product type, e.g., fashion, home, etc., as exemplary shown in FIG. 15.

In accordance with an exemplary embodiment of the claimed invention, as exemplary shown in FIGS. 13 and 14, when the client device 300 associated with the subscriber (i.e., a registered user) access the server 100, the processor 100 transmits an application page or GUI 2300 to the client device 300. The client device 300 displays the application page 2300 comprising the subscriber's or primary user registry GUI 2310. In accordance with an exemplary embodiment of the claimed invention, the primary user registry GUI 2310 comprises one or more following exemplary selectable or clickable GUIs displaying: product/items on the user's wish list 2320, the purchase list 2330 of the products/items purchased by the user, products/items on the user's bookmark 2340, products/items on the user's deleted list 2350, user's approved social groups 2360, user's favorite stores list 2341 and user's favorite brands list 2342. When the user clicks or selects the approved social group GUI 2360, the processor 110 displays expanded GUI 2365 with photos or identifier (e.g., username, nick name, etc.) of various members of the user's approved social group/registries.

In accordance with an exemplary embodiment of the claimed invention, as exemplary shown in FIG. 13, the color search engine 120 automatically performs default searches for products based user color preference history 2430 and/or the user's personalized color bar display 2620, preferably each time the user color preference history 2430 and/or user's personalized color bar display 2620 is updated. When the client device 300 associated with the subscriber access the GUI 700 to initiate a color-based search query, the color based engine 120 transmits the search results 2420 returned by the database engine 250 in response to the default search to the client device 300 over the communications network 400. The client device 300 renders the received search results 2420 in the display area 706, as exemplary shown in FIG. 14.

In accordance with an exemplary embodiment of the claimed invention, as exemplary shown in FIG. 13, the color search engine 120 automatically performs default searches for products based on each approved social group member's color preference history 2440 and/or each member's personalized color bar display 2620, preferably each time the member's color preference history 2440 and/or member's personalized color bar display 2620 is updated. When the client device 300 associated with the subscriber access the GUI 700 to initiate a color-based search query for a member of the user's approved social group 2360 (i.e., a secondary user), the color based engine 120 transmits the search results 2420 returned by the database engine 250 in response to the default search for the secondary user to the client device 300 over the communications network 400. The client device 300 renders the received search results 2420 in the display area 706, as exemplary shown in FIG. 14.

In accordance with an exemplary embodiment of the claimed invention, the color search engine 120 ranks the search results 2420 or arranges the search results 2420 in an ordered list from most relevant to least relevant, e.g., the products/items with color hexadecimal code closer to the queried color is considered more relevant and is presented higher in the search result ordering. The color search engine 120 transmits the ranked or ordered search results 2420 to the client device 300 over the communications network 400 such that the client device 300 displays the search results 2420 in the display area 706 from most relevant to least relevant. In addition or alternatively, the color search engine 120 may consider other factors, such as user preference, product availability, Merchant or user ratings, in determining the ordered search results 2420, i.e., relevancy of the products/items on the search results 2420.

In accordance with an exemplary embodiment of the claimed invention, the user may view, rate, store, purchase, or discard the products/items on search results 2420 displayed on the display area 706 of the client device 300. The user module 150 maintains a browsing history for each user in the user database 202 and adds/keeps a product/item viewed by the user in the user's browsing history. That is, for example, if the user views a product in the user's search results 2420, the user module 150 adds the product to a listing of the user's browsing history stored in the user database 202. It is appreciated that the user make changes to her stored browsing history at any time. For example, if an item is of no interest to the user, the user may delete that item from her browsing history. In accordance with an exemplary embodiment of the claimed invention, a user may specify that a particular search is personal, the color search engine 120 will not make such search result 2420 available to anyone other than the user. That is, the color search engine 120 does not make that particular search result 2420 available to the user's approved social group 2360. If the user's search for product is for another person, e.g., a gift search for her spouse, the color search engine 120 may not make the search results 2420 available to her spouse, but may make it available to other members of the approved social group 2360. The user module 150 segments out the browsing information from the user's browsing history for any searches made for another person by the user to provide a more accurate user-specific browsing information.

In accordance with an exemplary embodiment of the claimed invention, a user may rate the products to indicate a level of interest (e.g., of no interest, of little interest, of great interest). The processor 110 or the user module 150 stores the user rating, whether it be according to a phrase (e.g., "of no interest"), or according to a numerical scale, as a numerical value associated with that product in the product database 206. The product recommendation engine 160 may utilize the user rating information to recommend products to members of the user's preapproved social group 2360 or other users of the claimed system.

If a user wants to delete any rating or does not want the processor 110 to store a viewed product in a browsing history stored in the user database 202, the user may select to discard any data associated with the viewed product. Should a user select to discard any data associated with the viewed product, the processor 110 or the user module 150 will either store no data or delete any data stored associated with the viewed product from the user database 202 or it will be stored that the user selected to delete the product from her profile.

In accordance with an exemplary embodiment of the claimed invention, the user can add one or more of the products displayed on the display area 706 to the user registry 2310, e.g., to the user's wish list 2320, or to the registry 2310 of a member of user's approved social group 2360. The registry module 140 allows a user to store, share, and edit a listing of products, such as a wish list 2320 or other registry of products. A user may select to save a selected product to a listing of products, such as a wish list 2320. A user and her members of her approved social group 2360, if permission is granted by the user, can view any saved listing by accessing the registry module 140 over the communications network 400 using her client device 300.

The client device 300 transmits a registry add request to the server 100 over the communications network 400 when the user selects a product to add to her registry 2310 from the display area 706. The registry module 140 adds the selected product to the user's registry 2310 stored in the user database 202 or to the registry 2310 of a member of the user's approved social group 2360. The registry module 140 further stores de-personalized product registry information in the product database 206, e.g., gender and demographic information of user showing interest in a product. The real-time analytics processor 170 may utilize such de-personalized information to determine a common or typical profile of users showing an interest in such a product.

In accordance with an exemplary embodiment of the claimed invention, the registry module 140 allows a user to share with another user (e.g., members of her approved social groups 2360) all or partial information stored for that user in the user database 202. Amount of information to be shared with members of her approved social groups 2360 can vary by group, e.g., user may elect to share more information with a group of her friends than a group of her work colleagues. The user may wish to share some of her user data (e.g., name, birthday, demographic data, and color preference information) with members of her approved social group 2360. This will allow any members of her approved social group 2360 to not only see the saved listings of products, but also any other information selected by the user to share with her approved social group 2360, such as user's browsing history, product ratings, calendar, color preferences, personal information, favorite brands list 2342, favorite store list 2341, etc. In this manner, members of the user's social group 2360 may see that a certain event, such as the user's birthday or anniversary, is occurring and may view her wish list 2320 to purchase an appropriate gift for the user.

In accordance with an exemplary embodiment of the claimed invention, a first user may request to share specified information with that second user. Once a second user accepts that request, the first user and the second user may share all or parts of their user data, product data and/or color data stored in the data warehouse 200 with each other and each may associate that second user with a certain contact grouping 2360. By way of example, a contact grouping may be friends, family, romance, work, etc. The registry module 140 stores each accepted request and associated contact grouping or social group 2360 in the user database 202 and links the social group to the stored user data.

As exemplary shown in FIG. 13, the registry module 140 provides or displays the user profile information, social groups 2360, wish list 2320, purchase list 2330, bookmarks 2340, browsing history, etc. for viewing by the user on the application page 2300 displayed on the client device 300. The processor 110 transmits a primary user registry GUI 2310 to be displayed within the application page or GUI 2300 to the client device 300 over the communications network 400. The primary user registry GUI 2310 allows a user to access the registry module 140 to browse her contact or social groups 2360, to examine other user information, such as birthday information, and to shop for items that another user in the approved social group 2360 has posted on her wish list, browsing history, or purchase history. Furthermore, because the profile information of other users is available, the registry module 140 allows the user to set reminders for other users in the social group 2360, such as a birthday or other event reminders.

In accordance with an exemplary embodiment of the claimed invention, the user module 150 and/or registry module 140 present various GUIs on the client device 300 for the user to enter information regarding the user (such as birth date) and to identify affinity or social groups 2360 and members of affinity groups (such as friends, family, etc.) The user data may include a photograph and any user input for creating a user profile and/or color profile, and is stored in the user database 202. The registry module 140 may display a sliding GUI 2365 of people in the user's affinity or social group 2360 with photos or identifier (e.g., username, nick name, color preferences, etc.). In accordance with an exemplary aspect of the claimed invention, when the primary user clicks on the photo or identifier of a member of user's social group 2360, e.g., user 3 displayed on the sliding GUI 2365 in FIG. 13, the registry module 140 connects the primary user's client device 300 with the client device 300 of the user 3 over the communications network 400 so that the primary user can communicate with user 3 via text, email, voice and/or video.

In accordance with an exemplary embodiment of the claimed invention, the user module 150 stores user's calendar as user data in the user database 202, as well as events, e.g., birthday, anniversary, etc., and reminders. The user module 140 enables the user to connect past event information to her profile. The registry module 140 may link the past event information to user data stored in the user database 202, including event descriptions, event date information, event photographs, and event videos, such that other users who are connected to that user may view the event.

Figure 16:
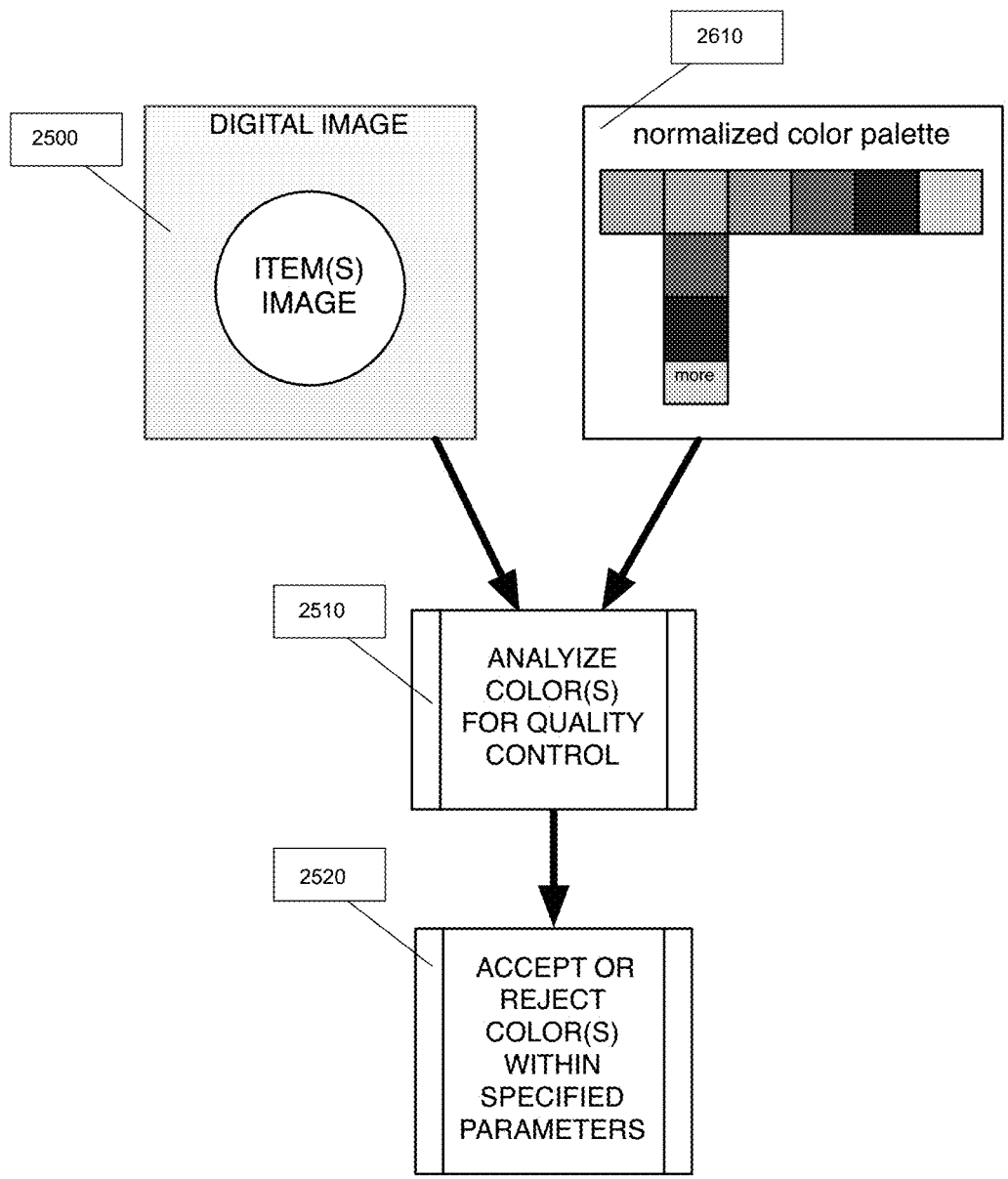
FIG. 16 is an exemplary flow diagram depicting an exemplary process for analyzing colors for quality control in accordance with an exemplary embodiment of the claimed invention.
Figure 17:
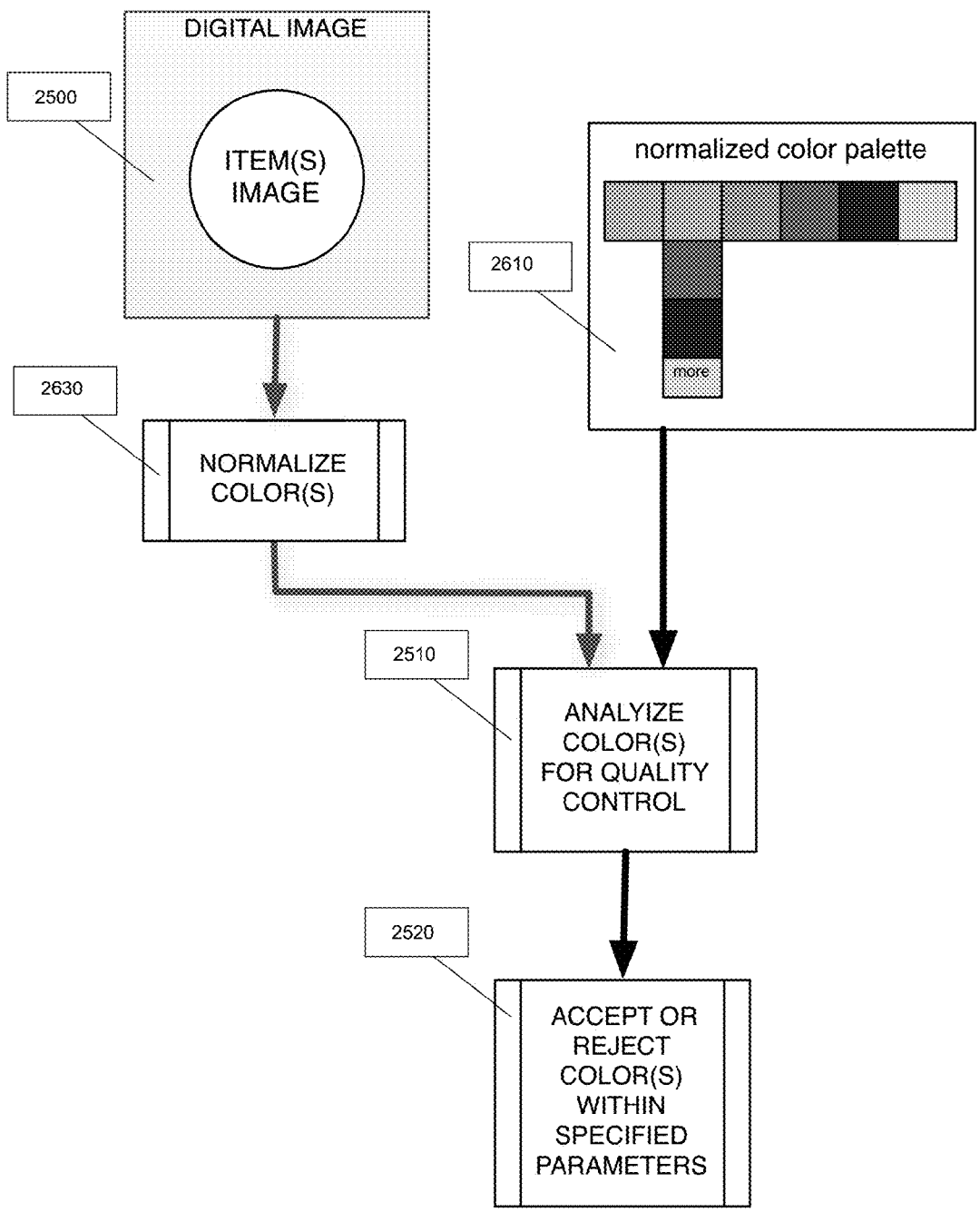
FIG. 17 is an exemplary flow diagram depicting an exemplary process for analyzing colors for quality control in accordance with an exemplary embodiment of the claimed invention.
Figure 18:
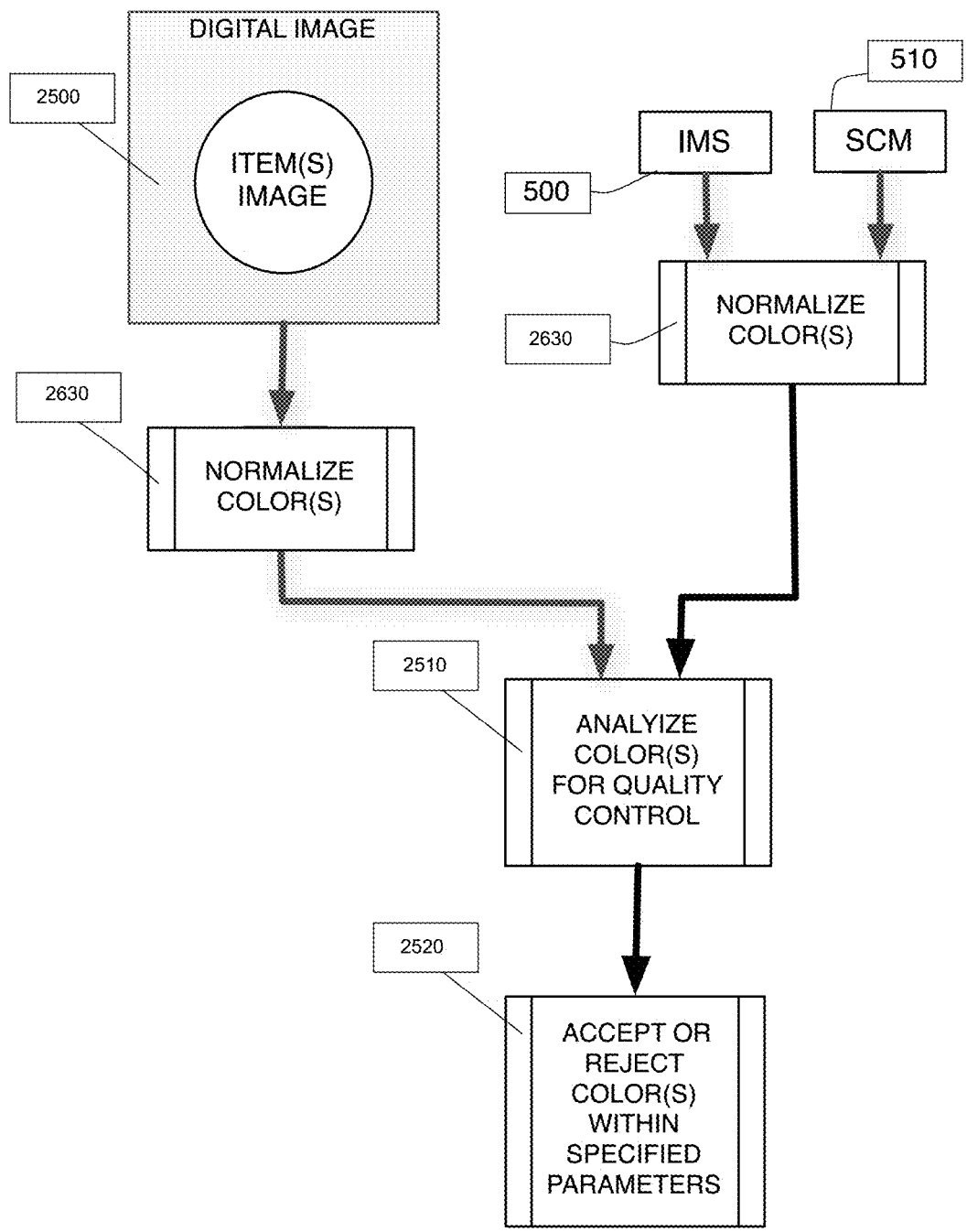
FIG. 18 is an exemplary flow diagram depicting an exemplary process for analyzing colors for quality control in accordance with an exemplary embodiment of the claimed invention.

In accordance with an exemplary embodiment of the claimed invention, as exemplary shown in FIGS. 16-18, the claimed invention may be utilized for quality control, e.g., to ensure that manufacturer has produced the goods in correct color. That is, as exemplary shown in FIG. 17, the client device 300 associated with the Merchant user transmits a color digital image 2500 of the product, e.g., a green shirt supposedly having the universal color code "11ff66," to the server 100 for verification or quality control over the communication network 400. The Merchant user utilizes its client device 300, such as a web enabled device 300, e.g., a smart phone 300 with a built-in camera 310, a tablet 300 with a built-in camera 310, a laptop 300 with a built-in camera 310, etc., to obtain a photo or digital image 2500 of a product/item and stores the captured image in the memory 330 of the client device 300. In addition or alternatively, the client device 300 may receive the digital image 2500 via email text, and the like, or retrieve the image 2500 from the memory 330 of the client device 300.

In accordance with an exemplary embodiment of the claimed invention, the processor 320 of the client device 300 normalizes and codifies colors from one or more digital images 2500 of the product/item selected by the user into the universal color language/system. The client device 300 transmits the universal color code(s) associated with the digital image 2500 to the server over the communications network 400 via the network connection facility 350. As described more fully in applicant's normalization/codification application and as exemplary shown in FIGS. 8a-8g and 12, in accordance with an exemplary embodiment of the claimed invention, the processor 320 of the client device 300 performs a "mobile" or "light" version of the full normalization process 2630 performed by the server 100. In addition or alternatively, the processor 320 of the client device 300 may perform none of the normalization process 2630 and rely entirely on the server 100. That is, the client device 300 may transmit the digital image 2500 to server 100 to identify the dominant colors. It is appreciated that this does not necessarily preclude the client device 300 with a more powerful processor 320 and a larger memory 330 from performing the full normalization process 2630 as preformed by the server 100.

In accordance with an exemplary embodiment of the claimed invention, as exemplary shown FIGS. 8a-8g, 12 and 16-18, the processor 320 of the client device 300 or the image processor 180 of the server 100 receives a digital image 2500 of a shirt with patterns for processing and recognition at step 1000. In the full normalization process 2630, the image processor 180 performs the steps 1010-1070. For the mobile normalization process, the processor 320 or image processor 180 skips the steps 1020-1040 shown in FIG. 12. Since both the mobile normalization and full normalization process 2630 has already been described herein, the discussion will not be repeated here.

After the colors have been identified, the processor 320 or the image processor 180 associates the identified colors with this particular digital image 2500 and stores these codified color data in the memory 330 or the data warehouse 200 at step 1070. In the case where the mobile normalization process is performed by the processor 320, the client device 300 transmits the codified color data of the digital image 2500 (i.e., the identified hexadecimal color code(s) associated with the digital image 2500) to the server 100 over the communications network 400 via the network connection facility 350 for analysis and processing 2510.

For an authorized Merchant user or licensee of the service provider, the user has access to the normalized or personalized color bar display 2610, 2620 on its client device 100 to select the color(s) 702, 703 of the product/item ordered from the manufacturer, e.g., a green shirt having the universal color code "11ff66" in this hypothetical example. The selection of colors for quality control by the Merchant user is similar to the selection of colors by the consumer/Merchant user for initiating color-based search query as described herein. The client device 300 transmits the color code "11ff66" of the product/item ordered or to be produced/manufactured by the manufacturer to the server 100 over the communications network 400. The server processor 110 compares/analyzes the universal color code of the digital image 2500 (i.e., the color of the manufactured item) received from the client device 300 or determined by the image processor 180 to the universal color code associated with the color of the ordered product/item received from the client device 300. The server processor 110 either determines whether the universal color code of the digital image 2500 of the manufactured product/item matches or is within a predetermined parameters or threshold 2520, which may be established by the Merchant or the service provider, of the universal color code of the ordered product/item. That is, the server processor 110 determines if the color of the manufactured product/item matches or is within the predetermined range or threshold of the color of the ordered item. The server processor 110 transmits an accept message to the client device 300 over the communications network 400 if the color of the manufactured product/item matches or is within the predetermined threshold 2520. In the hypothetical example 2, where the universal color code of manufactured product/item is "11ff55," the server processor 110 transmits an accept message to the client device 300 because the color of the manufactured product/item is within the predetermined threshold 2520. That is, the color of the manufactured product/item is accepted because it is very similar to the color of the ordered product/item. However, the server processor 110 transmits a reject massage to the client device 300 over the communications network if the manufactured product/item does not match or is not within the predetermined threshold 2520. In the hypothetical example 1, where the universal color code of manufactured product/item is "11ffcc," the server processor 110 transmits a reject message to the client device 300 because the color of the manufactured product/item is not within the predetermined threshold 2520. That is, the color of the manufactured product/item is rejected because it is different from the color of the ordered product/item.

For an unauthorized Merchant user or non-licensee of the service provider, when the client device 300 associated with the unauthorized Merchant user (i.e., non-subscriber) attempts to access the server 100, in accordance with an exemplary embodiment of the claimed invention, the server processor 110 denies the client device 300 access to the server 100 and transmits a registration webpage to the client device 300 so the user can subscribe to the services provided by the service provider and become a registered/authenticated subscriber using any known methods. After completing the registration process, the user has an option of downloading the mobile normalization and/or categorization process application onto her client device 300 to perform normalization, codification and categorization of the digital images 2500 locally on her client device 300. In addition or alternatively, the server 100 may permit the client device 300 of the unauthorized Merchant user to transmit digital image or data associated with the ordered product/item to the server 100 for normalization, codification and categorization. As exemplary shown in FIG. 12, the image processor 180 performs either mobile or full normalization process 2630 on both the digital image 2510 of the manufactured product/item and the image/data of the ordered product/item received from the client device 300 to identify the universal color code(s), preferably, the color hexadecimal code(s), of the of the manufactured product/item and ordered product/item. It is appreciated that the image/data of the ordered product/item may be from the Merchant's IMS 500 or SCM system 510. The server processor 110 then compares/analyzes the universal color codes of the manufactured product/item and ordered product/item to determine if the color of the manufactured product/item matches or is within predetermined threshold of the color of the ordered product/item, similar to the process for the authorized Merchant users.

The only way to correct inventory problems with the products are while they are in the SCM system 510, i.e., before the product is fully produced/manufactured. Those changes depend on the particular manufacturing stage of the product. Once the product is manufactured and enters the IMS 500, it is generally too late to make any substantive changes to the product. For instance, take a tee shirt. Once the raw fabric is converted and dyed into colors, the only change that can be made to the tee shirt is to change its style. For example, a crew neck can be substituted with a V-Neck or a short sleeve can be converted to a long sleeve. The earlier a mistake is identified and corrected in the production process, the more flexibility a manufacturer has to correct the mistake. The claimed color based and product related categorization in the SCM system 510 provides the necessary tool to implement this change in real-time and/or through predictive analytics.

The only way to correct inventory once it is part of the IMS 500 is to either reduce the price, return it to the supplier/manufacturer/vendor, or not ship it from the country of manufacturing origin to save duty and shipping costs. This is far less efficient/cost effective than identifying and correcting the problem while the product is part of the SCM system 510.

Generally, a formatted Spec Sheet allows the data to be conveyed from design to the SCM system 510 of the factory and the relevant component suppliers. In turn, the factory compiles all of the product-related information to provide cost sheets, minimums, and other relevant data in real-time to the Merchants.

Product data management (PDM) is the business function often within product lifecycle management (PLM) that is responsible for the management and publication of product data. The product data management is the only way to ensure that everyone is on the same page and that there is no confusion during the execution of the processes and that the highest standards of quality controls are maintained.

Product data management is the use of software or other tools to track and control data related to a particular product. The data tracked usually involves the technical specifications of the product, specifications for manufacture and development, and the types of materials that will be required to produce goods. The use of product data management allows a company to track the various costs associated with the creation and launch of a product. Product data management is part of product lifecycle management and configuration management.

Within PDM, the focus is on managing and tracking the creation, change and archive of all information related to a product. The information being stored and managed (on one or more file servers) will include engineering data such as computer-aided design (CAD) models, drawings and their associated documents.

Product data management (PDM) serves as a central knowledge repository for process and product history, and promotes integration and data exchange among all business users who interact with products, including project managers, engineers, sales people, buyers, and quality assurance teams.

The central database will also manage metadata such as owner of a file and release status of the components. The package will: control check-in and check-out of the product data to multi-user; carry out engineering change management and release control on all versions/issues of components in a product; build and manipulate the product structure bill of materials (BOM) for assemblies; and assist in configurations management of product variants.

This enables automatic reports on product costs, etc. Furthermore, PDM enables companies producing complex products to spread product data into the entire PLM launch-process. This significantly enhances the effectiveness of the launch process.

Product data management is focused on capturing and maintaining information on products and/or services through its development and useful life. Typical information managed in the PDM system 2000 include but not limited to: part number, part description, supplier/vendor, vendor part number and description, unit of measure, cost/price, schematic or CAD drawing, and material data sheets.

Utilities and advantages of PDM include: track and manage all changes to product related data; spend less time organizing and tracking design data; improve productivity through reuse of product design data; enhance collaboration; and helps using visual management PDM stems from traditional engineering design activities that created product drawings and schematics on paper and using CAD tools to create parts lists (Bills of Material structures—BOM). The PDM and BOM data is used in enterprise resource planning (ERP) systems to plan and coordinate all transactional operations of a company (sales order management, purchasing, cost accounting, logistics, etc.)

PDM is a subset of a larger concept of product lifecycle management (PLM). PLM encompasses the processes needed to launch new products (NPI), manage changes to existing products (ECN/ECO) and retire products at the end of their life (End of Life).

PDM system 2000 is the bridge between the SCM system 510 and the IMS 500. In accordance with an exemplary embodiment of the claimed invention, the claimed system is a universal digital color language or system to categorize the color-based, product-related, and consumer-centric data. Without a common denominator, e.g., color, there is no meaningful way to organize all of this data—which is why "BIG DATA" has failed so far.

Figure 21:
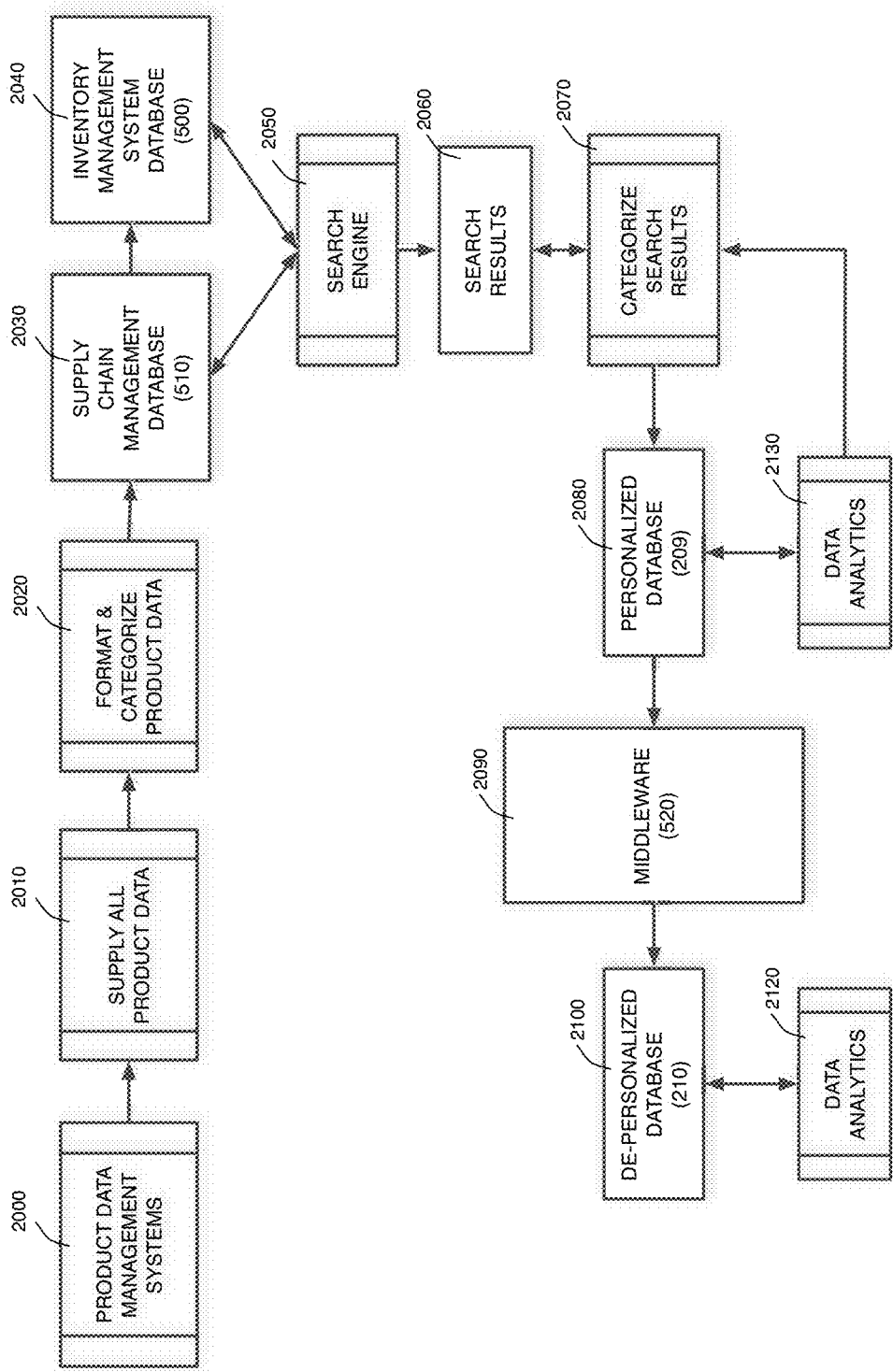
FIG. 21 is an exemplary flow chart depicting an exemplary dynamic process of normalizing, codifying and categorizing Merchants' IMS and SCM data feeds, and categorizing search results.
Figure 22:
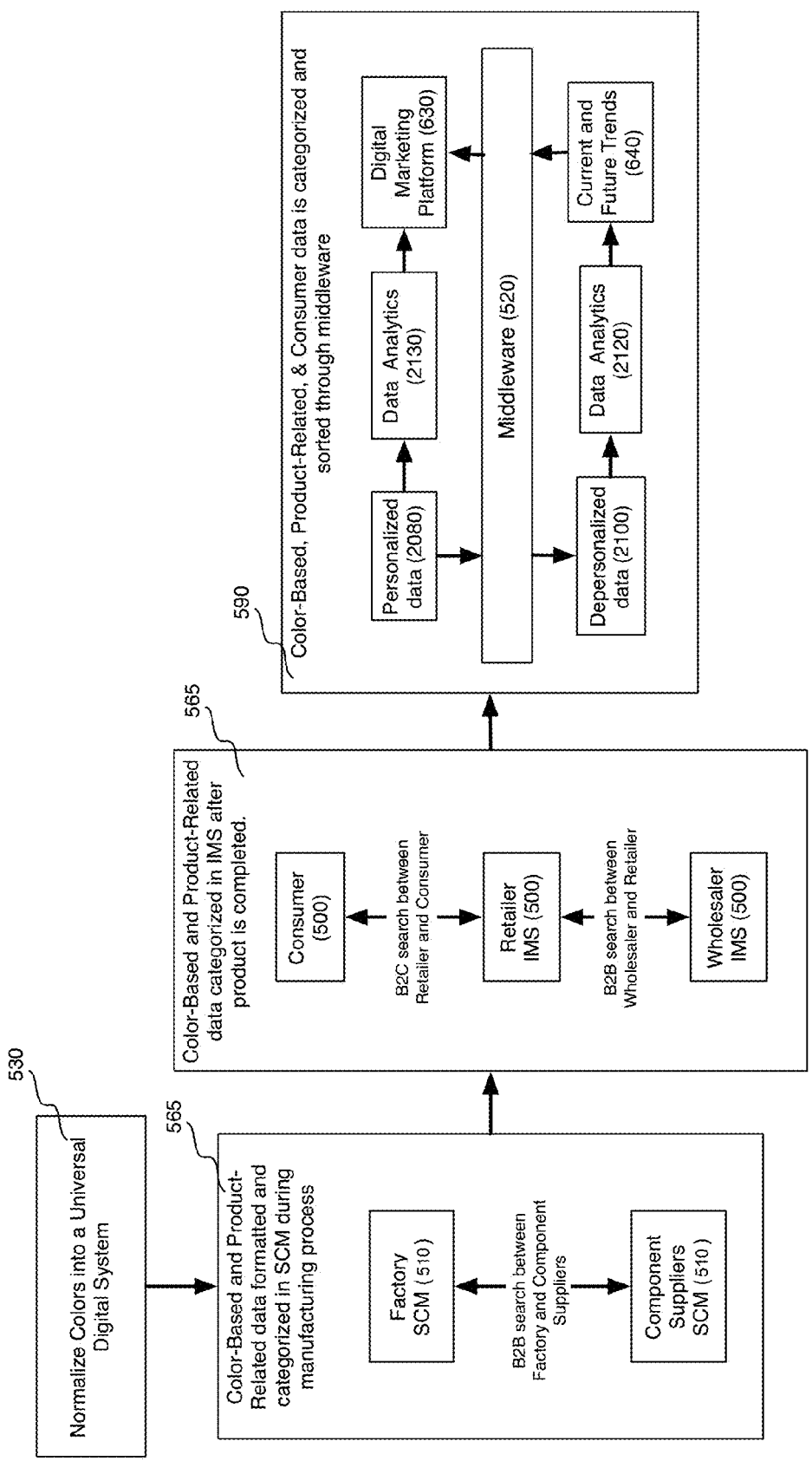
FIG. 22 is an exemplary flow chart depicting an exemplary dynamic system process of normalizing, codifying and categorizing Merchants' IMS and SCM data feeds, and categorizing search results.

In accordance with an exemplary embodiment of the claimed invention, as exemplary shown in FIGS. 21 and 22, the claimed system categorizes the search results by color and by product category and as part of its process of normalizing, codifying and categorizing IMS feeds 505 and 515 to reverse map and convert Merchants' divergent color systems into one universal color language/system. That is, the middleware engine 520 receives product data from the product data management systems 2000 of a plurality of Merchants at step 2010. The middleware engine formats, normalizes, codifies and categorizes the product data into one universal color language/system at step 2020. The middleware engine 520 stores the formatted, normalized, codified and categorized SCM data 515 into the appropriate Merchant's SCM system 510, preferably the Merchant's SCM database (shown as the part of the SCM system 510) at step 2030. The middleware engine 520 stores the formatted, normalized, codified and categorized IMS data 505 into the appropriate Merchant's IMS 500, preferably the Merchant's IMS database (shown as the part of the IMS 500) at step 2040. In accordance with an exemplary embodiment of the claimed invention, the color search engine 120 of the server 100 provides the verified user access to the search query functions via a graphical user interface (GUI) 700 and the processor 110 of the server 100 provides the verified Merchant user with access to additional data available to them under its subscription. Unlike the consumer user/subscriber, the Merchant user/subscriber can search the SCM systems 510 to determine the production status/schedule of a particular product and/or to examine/verify the color and specification of the components of the product before moving forward with the production of the product.

As described herein, the color search engine 120 searches the database engine 250 that meet the user's color search criteria 2400, e.g., the associated digital color code(s) corresponding to the selected color swatch(es) 702, at step 2050. The color search engine 120 transmits the search results 2420 containing information about the products matching the user's color search criteria 2400 to the client device 300 associated with the user over the communications network at step 2060. The color search engine 120 stores the color search criteria 2400 and the search results 2420 in the data warehouse 200. Preferably, the color search engine 120 updates the user color preference history 2430 based on the user's color search criteria 2400.

As described herein, the product categorization engine 190 categorizes the search results based on color and product category at step 2070. As exemplary shown in FIGS. 19-22, the product categorization engine 190 of the server 100 determines the product category of the color analyzed product, e.g., clothing, furniture, car, etc., and categorizes the color analyzed product by product category at step 565. The product categorization engine 190 stores the categorized search results in the personalized database 209 at step 2080. That is, the product categorization engine 190 stores categorized search results including the personalized information, such as user name, store name, brand name, age, gender, etc., or personalized search results in the personalized database 209. The middleware engine 520 strips personalized information, such as any information that can identify the Merchant and user who initiated the query from the categorized search results to provide depersonalized search results at step 2090. The middleware engine 520 stores the depersonalized search results in the depersonalized database 210 at step 2100. In other words, the color search engine 120 and product categorization engine 190 conveys the user's selections or records to the real-time analytics processor 170 of the server 100 for processing and analysis.

In accordance with an exemplary embodiment of the claimed invention, the real-time analytics processor 170 can access the depersonalized database 210 to analyze the data for trends and preferences at step 2120. Also, the real-time analytics processor 170 can analyze the depersonalized data at step 590 to determine a common or typical profile of users purchasing such a product or to determine color trends based on gender, age, geo-location and the like. Such data analytics would be useful to Merchants for both marketing and operations purposes.

In accordance with an exemplary embodiment of the claimed invention, the real-time analytics processor 170 can access the personalized database 209 at step 2130 to determine user preferences for colors and patterns by analyzing user browsing and purchasing behavior, and with associated user data, such as demographic data. Such information can be made available across a variety of user variables (e.g., gender, age, geography, etc.). Also, at step 590, the real-time analytics processor 170 can couple the demographic data with other data such as, but not limited to, a user's purchase and shopping history, as well as data regarding industry trends and consumer color preferences, so as to algorithmically recommend colors and products to both users and Merchants.

In accordance with an exemplary embodiment of the claimed invention, the middleware engine 520 re-categorizes the formatted, normalized, codified and categorized IMS data 505 in the Merchant's IMS 500, preferably the Merchant's IMS database, in accordance with the categorized search result, preferably de-personalized categorized search result. Also, the middleware engine 520 re-categorizes the formatted, normalized, codified and categorized SCM data 515 in the Merchant's SCM system 510, preferably the Merchant's SCM database, in accordance with the categorized search result, preferably de-personalized categorized search result.

In accordance with an exemplary embodiment of the claimed invention, the middleware engine 520 utilizes the users' browsing histories and/or color preference histories to re-categorize the categorized IMS data 505 and the categorized SCM data 515. Preferably, the middleware engine 520 weights various information in the users' color preference histories and/or browsing histories differently, such as based on the relevancy of the information by giving a greater weight the purchased products/items than viewed products/items.

The accompanying description and drawings only illustrate several embodiments of a system, methods and interfaces for color-based identification, searching and matching, however, other forms and embodiments are possible. Accordingly, the description and drawings are not intended to be limiting in that regard. Thus, although the description above and accompanying drawings contain much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments may be practiced by those of ordinary skill in the art without departing from the spirit and scope of the invention.

The invention claimed is:

1. A computer based method for normalizing, codifying, and categorizing divergent color systems into a universal color system, comprising the steps of:
   receiving a data feed comprising a plurality of color swatches or images from a merchant system by a middleware engine of a processor based server over a communications network;
   normalizing the data feed into a common format by the middleware engine;
   extracting image data comprising a plurality of product images from the normalized data feed;
   segmenting each product image into a plurality of segments by an image segmentation processor;
   analyzing each segment to determine a dominant color for said each segment by a dominant color processor;
   determining at least one dominant product color for said each product image based on prevalence of said at least one dominant product color in said each segment by the dominant color processor;
   assigning a hexadecimal code of the universal color system to said each product image that is closest to a digital hexadecimal value of said each product image based on color component intensity values of said at least one dominant product color of said each product image by a matched color processor;
   categorizing said each product image into one of a plurality of product categories by a product categorization engine;
   categorizing said each product image in each product category by the hexadecimal code assigned to said each product image; and
   storing the data feed, said each product image, said each segment of said each product image, the dominant color for said each segment, said at least one dominant product color for said each product image, the hexadecimal code of said each product image, and the product category of said each product image in a database by the server.

2. The method of claim 1, further comprising the step of categorizing said each product image in accordance with at least one product related data.

3. The method of claim 1, further comprising the step of categorizing said each product image in accordance with at least one depersonalized product related data.

4. The method of claim 1, further comprising the steps of:
   receiving data feeds from a plurality of supply chain management systems by the middleware engine over the communications network;
   normalizing comprises the step of depersonalizing the data feeds received from said plurality of supply chain management systems to remove merchant or supplier identifying information by the middleware engine; and
   generating a product database from the data feeds received from said plurality of supply chain management systems indexed and searchable by color based queries.

5. The method of claim 1, further comprising the steps of:
   receiving data feeds from a plurality of inventory management systems by the middleware engine over the communications network;
   normalizing comprises the step of depersonalizing the data feeds received from the inventory management systems to remove merchant or consumer identifying information by the middleware engine; and
   generating a product database from the data feeds received from said plurality of inventory management systems indexed and searchable by color based queries.

6. The method of claim 1, further comprising the steps of:
   receiving a color-based search query comprising user's color selection from a processor based client device associated with a user by the server over the communications network, the user's color selection comprising at least one hexadecimal color code of the universal color system; and
   searching a database engine by a color search engine of the server for products having the hexadecimal color codes within a predetermined range of the hexadecimal color code of the user's color selection to provide a search result, the database engine comprising at least one of a data warehouse maintained by a service provider, inventory management systems of a plurality of merchants, or supply chain management systems of a plurality of merchants;
   storing the user's color selection and the search result in the database; and
   updating color preference history of the user in the database.

7. The method of claim 6, further comprising the steps of categorizing the search result by the product categorization engine in accordance with at least one of the following: a color category, a product category, a product related data or a depersonalized product related data; and storing the categorized search result in the database.

8. The method of claim 7, further comprising the step of categorizing said each product image in accordance with the categorized search result; and storing categorized product images in the database.

9. The method of claim 7, further comprising the step of categorizing said each product image in accordance with the categorized search result utilizing the color preference history; and storing categorized product images in the database.

10. The method of claim 1, further comprising the steps of:
   receiving a color-based search query from a processor based client device associated with a user by the server over the communications network, the color-based search query comprises a digital image of an item and the hexadecimal color code associated with the item;
   repeating the steps of segmenting, analyzing, determining, and assigning on the digital image of the item to assign the hexadecimal code of the universal color system to the item; and
   determining whether the hexadecimal code determined from the digital image of the item matches or is within a predetermined threshold of the hexadecimal code of the item received from the client device of the user by an image processor of the server.

11. A system for normalizing, codifying and categorizing divergent color systems into a universal color system, comprising:
a server connected to a communications network for receiving, processing, codifying and categorizing divergent color data from a merchant system, the server comprising:
a middleware engine to receive a data feed comprising a plurality of color swatches or images from said merchant system, and normalizing the data feed into a common format;
an image segmentation processor to extract image data comprising a plurality of product images from the normalized data feed, and segmenting each product image into a plurality of segments;
a dominant color processor to analyze each segment to determine a dominant color for said each segment, and determine at least one dominant product color for said each product image based on prevalence of said at least one dominant product color in said each segment;
a matched color processor to assign a hexadecimal code of the universal color system to said each product image that is closest to a digital hexadecimal value of said each product image based on color component intensity values of said at least one dominant product color of said each product image;
a product categorization engine to categorize said each product image into one of a plurality of product categories and to categorize said each product image in each product category by the hexadecimal code assigned to said each product image; and
a database for storing the data feed, said each product image, said each segment of said each product image, the dominant color for said each segment, said at least one dominant product color for said each product image, the hexadecimal code of said each product image, and the product category of said each product image.

12. The system of claim 11, wherein the product categorization engine further categorizes said each product image in accordance with at least one product related data.

13. The system of claim 11, wherein the product categorization engine further categorizes said each product image in accordance with at least one depersonalized product related data.

14. The system of claim 11, wherein the middleware engine receives data feeds from a plurality of supply chain management systems over the communications network and depersonalizes the data feeds received from said plurality of supply chain management systems to remove merchant or supplier identifying information; and wherein the server generates a product database from the data feeds received from said plurality of supply chain management systems indexed and searchable by color based queries.

15. The system of claim 11, wherein the middleware engine receives data feeds from a plurality of inventory management systems over the communications network and depersonalizes the data feeds received from the inventory management systems to remove merchant or consumer identifying information; and wherein the server generates a product database from the data feeds received from said plurality of inventory management systems indexed and searchable by color based queries.

16. The system of claim 11, wherein the server further comprises a color search engine to:
receive a color-based search query comprising user's color selection from a processor based client device associated with a user over the communications network, the user's color selection comprising at least one hexadecimal color code of the universal color system;
search a database engine for products having the hexadecimal color codes within a predetermined range of the hexadecimal color code of the user's color selection to provide a search result, the database engine comprises at least one of the following: a data warehouse maintained by a service provider, inventory management systems of a plurality of merchants, or supply chain management systems of a plurality of merchants;
store the user's color selection and the search result in the database; and
update color preference history of the user in the database.

17. The system of claim 16, wherein the product categorization engine categorizes the search result by the product categorization engine in accordance with at least one of a color category, a product category, a product related data, or a depersonalized product related data; and stores the categorized search result in the database.

18. The system of claim 17, wherein the product categorization engine categorizes said each product image in accordance with the categorized search result; and stores categorized product images in the database.

19. The system of claim 17, wherein the product categorization engine categorizes said each product image in accordance with the categorized search result utilizing the color preference history; and stores categorized product images in the database.

20. The system of claim 11, wherein the server further comprises a color search engine to receive a color-based search query from a processor based client device associated with a user over the communications network, the color-based search query comprises a digital image of an item and the hexadecimal color code associated with the item;
wherein the image segmentation processor segments the digital image of the item into a plurality of segments;
wherein the dominant color processor analyzes each segment to determine a dominant color for said each segment, and determines at least one dominant product color for the digital image of the item based on prevalence of said at least one dominant product color in said each segment;
wherein the matched color processor assigns a hexadecimal code of the universal color system to the digital image of the item that is closest to a digital hexadecimal value of the digital image of the item based on color component intensity values of said at least one dominant product color of the digital image of the item; and
wherein the server further comprises an image processor to determine whether the hexadecimal code determined from the digital image of the item matches or is within a predetermined threshold of the hexadecimal code of the item received from the client device of the user.

* * * * *